(12) United States Patent
Kammerer et al.

(10) Patent No.: US 6,588,551 B1
(45) Date of Patent: Jul. 8, 2003

(54) HYDRAULIC ACTUATING SYSTEM

(76) Inventors: Martin Kammerer, Freudenstaedter Str. 12, D-72336, Balingen (DE); Thomas Preuhs, Butzensteigleweg 16/2, D-72348, Rosenfeld (DE)

(*) Notice: Subject to any disclaimer, the term of this patent is extended or adjusted under 35 U.S.C. 154(b) by 0 days.

(21) Appl. No.: 09/743,057
(22) PCT Filed: Jul. 1, 1999
(86) PCT No.: PCT/DE99/02011
§ 371 (c)(1), (2), (4) Date: Apr. 2, 2001
(87) PCT Pub. No.: WO00/01954
PCT Pub. Date: Jan. 13, 2000

(30) Foreign Application Priority Data

Jul. 1, 1998 (DE) .................................. 198 29 465

(51) Int. Cl.[7] ........................... F15B 15/10; A63C 17/14
(52) U.S. Cl. .................. 188/71.5; 188/4 R; 280/11.212
(58) Field of Search ....................... 280/11.212, 11.217, 280/11.226; 188/4 R, 71.5

(56) References Cited

U.S. PATENT DOCUMENTS 5,375,859 A * 12/1994 Peck et al. .................. 280/11.2
5,934,691 A * 8/1999 Stivali ....................... 280/11.2

* cited by examiner

Primary Examiner—Christopher P. Schwartz
(74) Attorney, Agent, or Firm—Conelly Bove Lodge & Hutz, LLP

(57) ABSTRACT

A skate, such as a roller skate or inline skate, comprises a shoe, a chassis and rollers or wheels suspended in the chassis. The skate also includes a braking system for at least one of the rollers or wheels. The braking system comprises a braking element which engages the roller and includes at least one actuation element for acting on the braking element. The braking force of the braking system is obtainable at low rotational or rolling speed of the roller to be braked and is small and increases with increasing rotational or rolling speed of the roller to be braked.

16 Claims, 22 Drawing Sheets

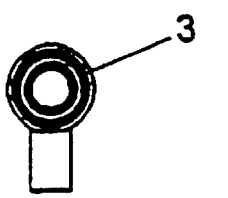
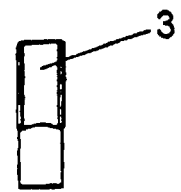
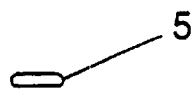
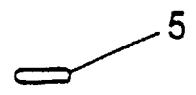
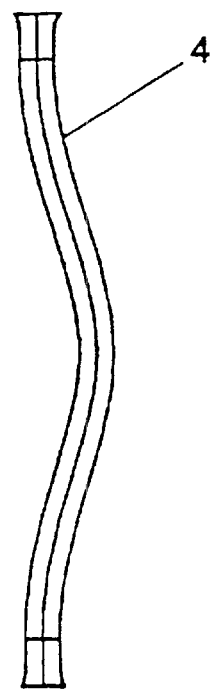
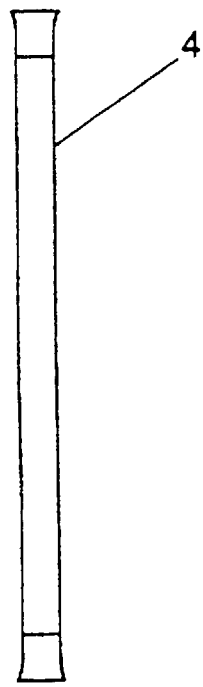
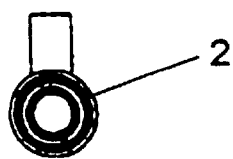
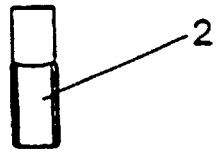
FIG. 4        FIG. 5

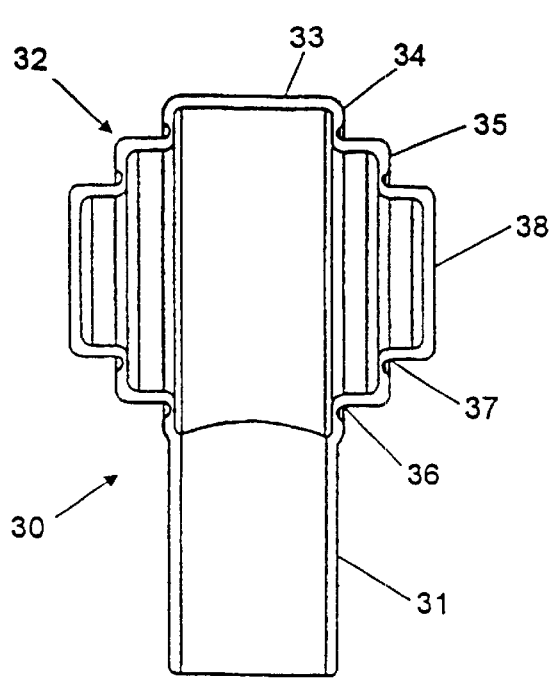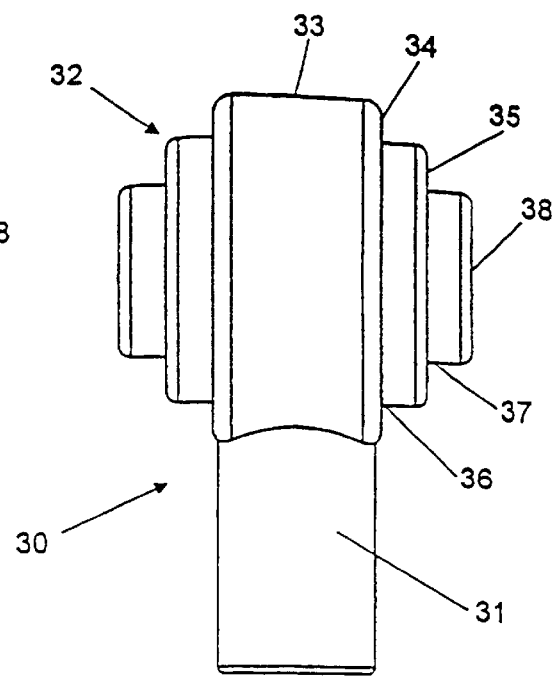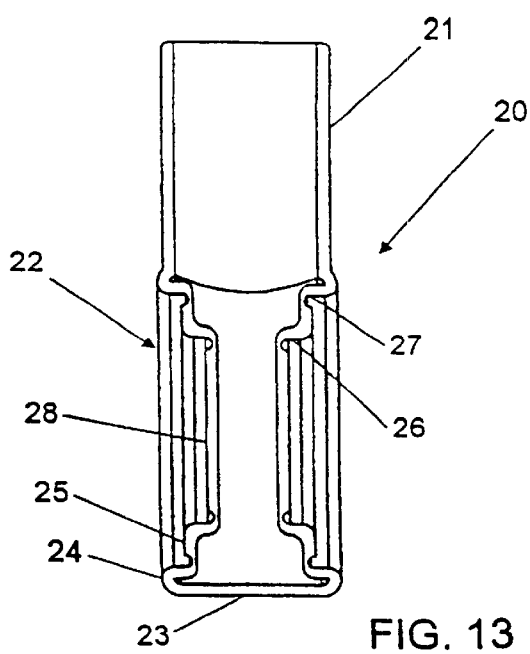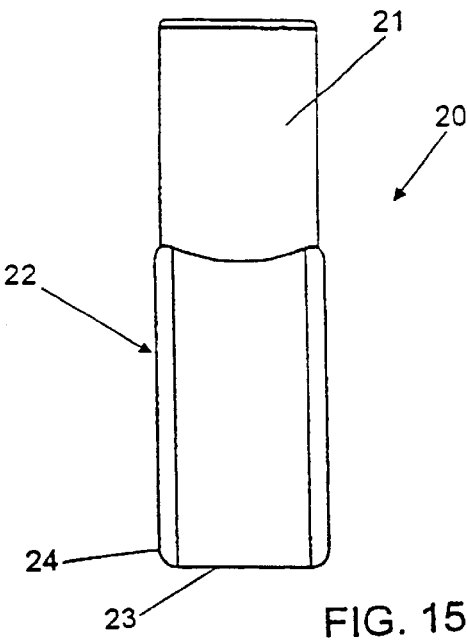
FIG. 12
FIG. 14
FIG. 13
FIG. 15

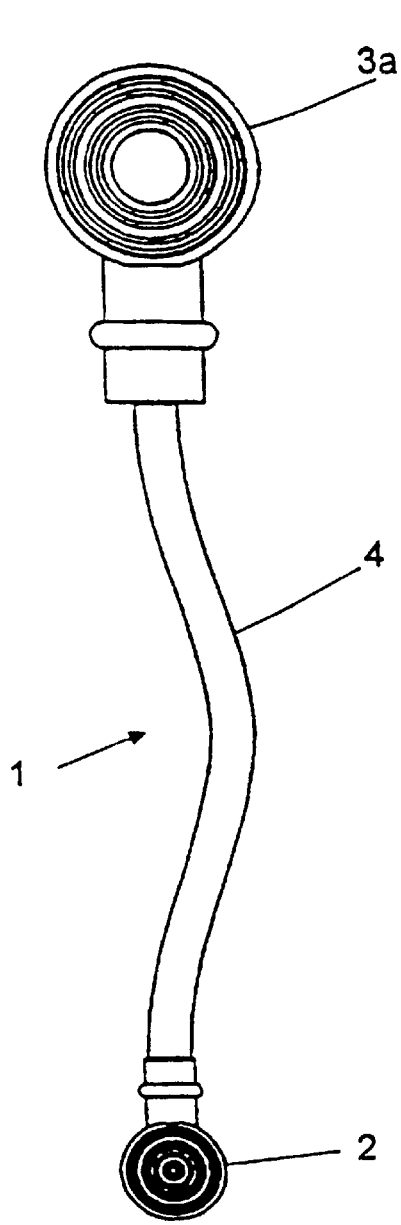
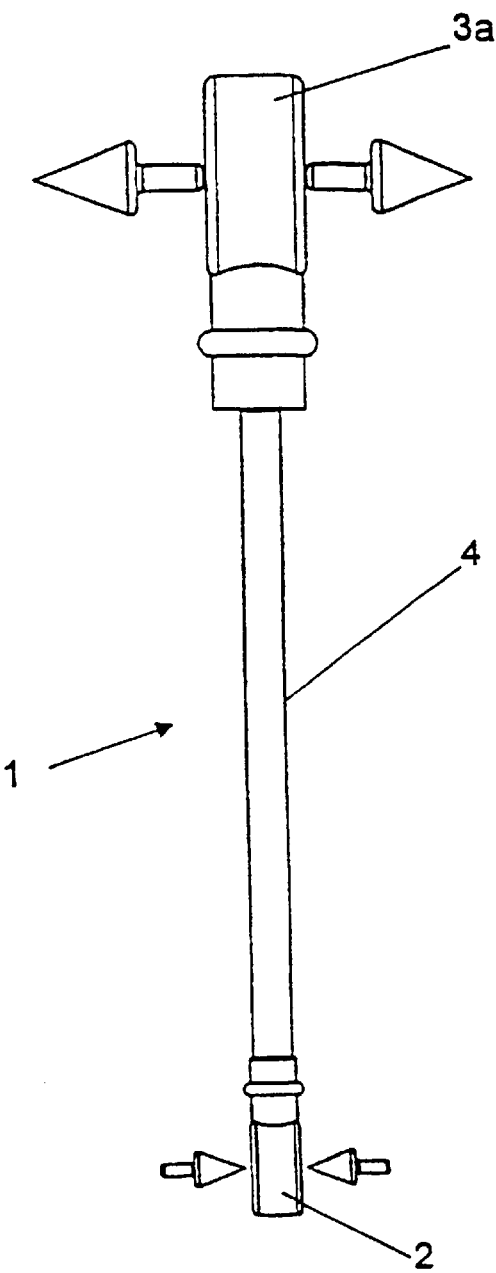
FIG. 20
FIG. 21

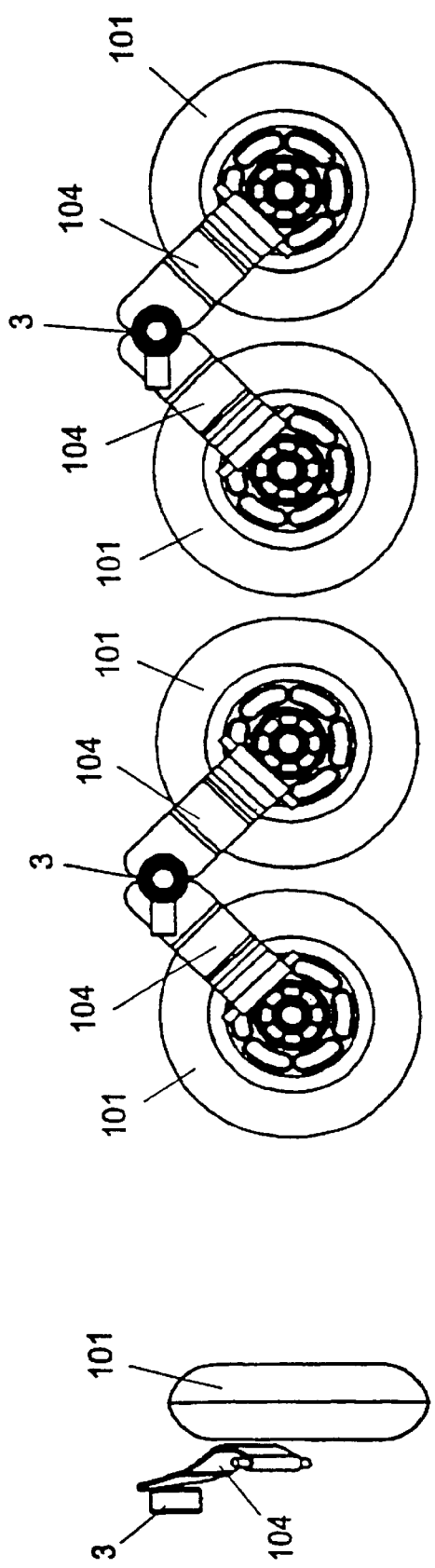
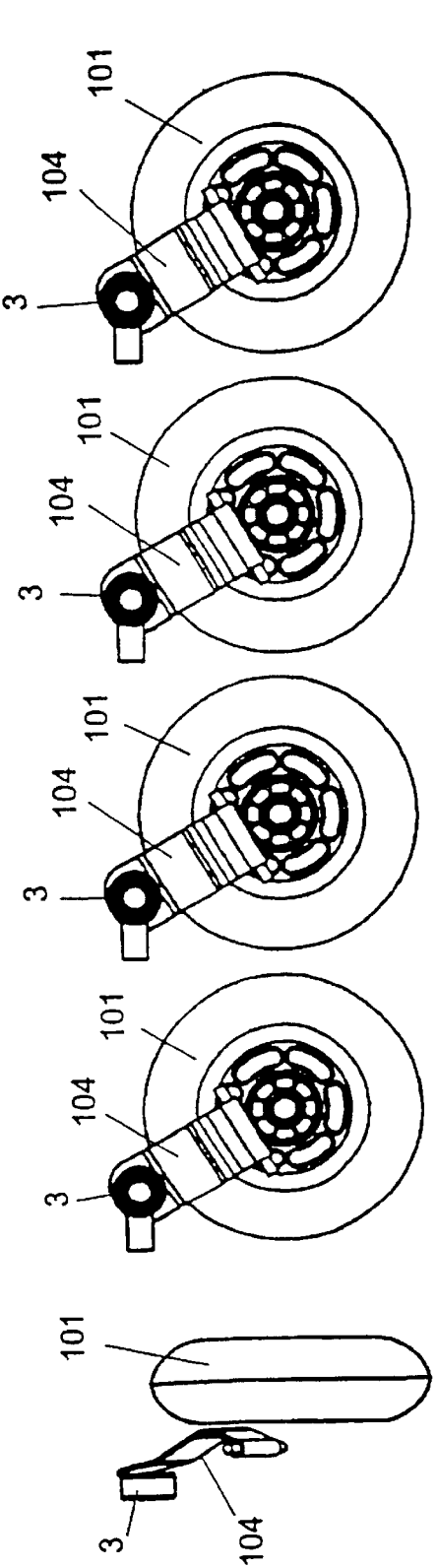

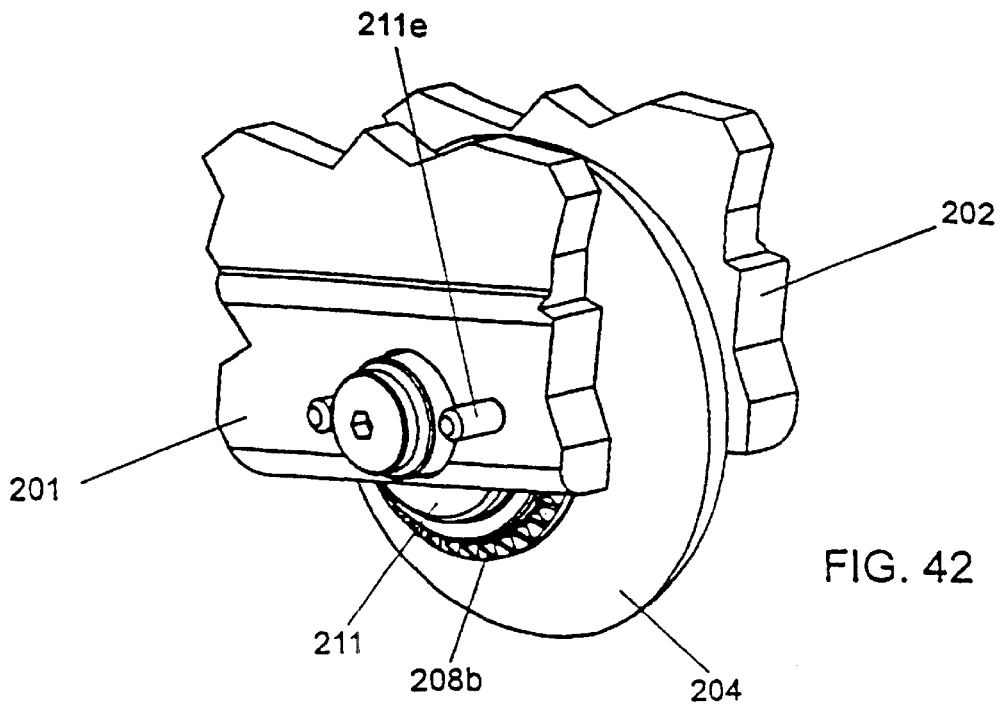
FIG. 42
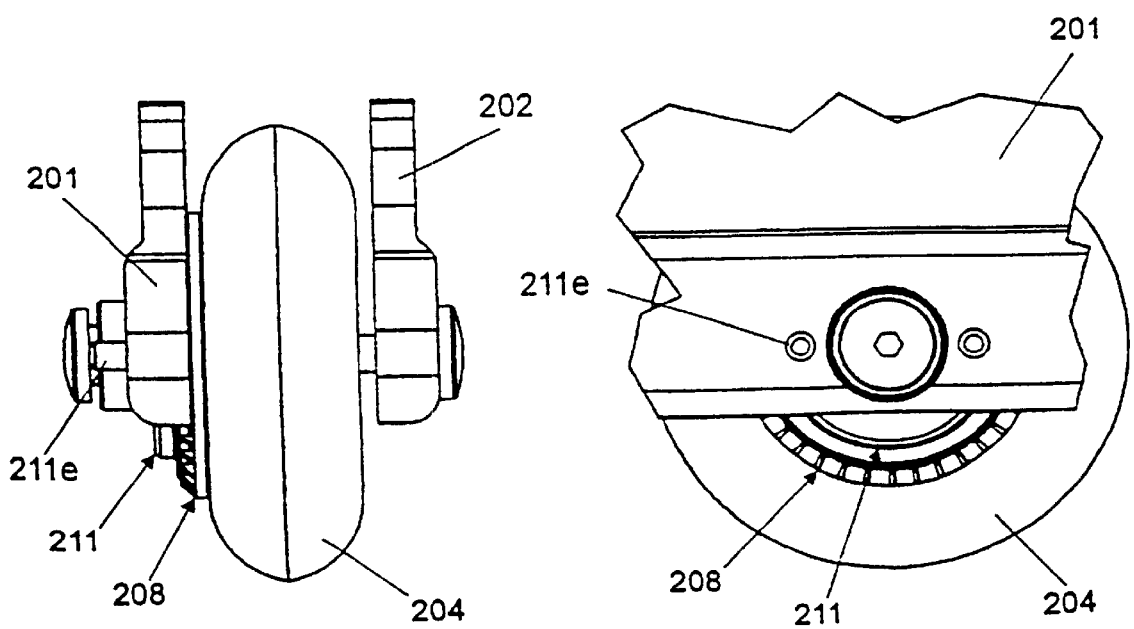
FIG. 43
FIG. 44

HYDRAULIC ACTUATING SYSTEM

BACKGROUND OF THE INVENTION

1. Field of the Invention

The present invention relates to a braking system for rollers, such as for rollers of inline skates, said braking system providing an anti-flattening or anti-blocking functionality and in which a hydraulic actuation system may be used.

2. Description of Related Art

Conventional force-path translation systems comprise, for example, transmissions or connecting rods. In the area of flexible force-path translation systems, there are the widely used wire cables (so-called Bowden cables) in the low cost segment, and hydraulic systems in the high cost segment.

Wire cables may be produced simply and at reasonable cost, but have various disadvantages. Actuation can occur only by pulling, but not by pushing. The transmission of force is subject to particularly high frictional losses. Branching off may be achieved only with utmost difficulties and with high losses. There is basically no possibility of control, closed-loop control or blocking.

Some of the disadvantages of wire cables are avoided by conventional hydraulic systems, however, hydraulic systems are complicated and expensive. In particular, the transmission losses are extremely small in hydraulic systems, it is possible to transmit forces both by pulling and pushing, branches are possible in a simple manner and practically without losses. Further, it is relatively easy to provide control, closed-loop control or blocking.

Conventional hydraulic systems normally comprise a large number of components. Usually, piston and cylinder assemblies are used a actuation or working elements, such assemblies requiring a large number of components wherein sealing between piston and c~1inder is necessary, and said assemblies involving a complicated structure and a relatively large size.

BRIEF SUMMARY OF THE INVENTION

Therefore, solutions using hydraulics are found exclusively in the high price segment. It is, thus, an object of the present invention to provide a hydraulic system which overcomes the drawbacks of the prior art and which may be produced simply and at low cost. The hydraulic system should be maintenance-free and should operate reliably.

In the present invention, a hydraulic actuation system may be used having at least one actuation/working element being implemented such that a compressing/expanding closed volume is provided by a single piece using appropriate material, hardness and geometry such that the compression/expansion acts directionally in the direction of actuation.

Preferably, the actuation/working element comprises a port or terminal for connection with a conduit, and a main body, said main body forming a chamber for receiving hydraulic fluid, which chamber being connected with said port or terminal but otherwise being closed, said main body further comprising a generally cylindrical outer wall extending in axial direction and two generally planar end walls extending generally perpendicular to the outer wall, wherein at least one of said end walls is formed such that at least a portion thereof is axially displaced upon a change in pressure of the hydraulic fluid in the chamber.

According to a preferred embodiment of the present invention, the end wall consists of an alternating array of relatively rigid portions maintaining their shape and relatively elastic portions providing for displacement, wherein the end wall is preferably circular and consists of an alternating concentric array of at least one relatively elastic ring providing for displacement and a relatively rigid circular center portion maintaining its shape. In addition, the end wall may comprise at least one relatively rigid ring maintaining its shape and at least two relatively elastic rings providing for displacement.

For coaxial applications, the main body may comprise a through-hole defined by a generally cylindrical inner wall extending in axial direction and arranged radially interiorly with respect to the outer wall. In this case, the end wall is preferably ring-shaped and consists of an alternating concentric array of at least one relatively rigid ring maintaining its shape and at least two relatively elastic rings providing for displacement.

In another embodiment of the actuation/working element, the outer wall of the main body is formed such that a circumferential radial channel or groove is formed while maintaining a uniform thickness of material.

The actuation/working element is preferably implemented as a single piece providing a simple structure. It is preferred that the actuation/working element is made of an elastomer or of elastic thermoplastics, e. g. having a hardness of 65°–75° Shore (A). A particularly cost-effective manufacturing method for the actuation/working element is injection molding. However, other methods of manufacturing are possible.

A particularly important part of the hydraulic actuation system is the actuation/working element which normally is connected with a conduit containing hydraulic fluid and which comprises a port or terminal for connection with said conduit, and a main body forming a chamber for receiving hydraulic fluid, which chamber being connected with said port or terminal but otherwise being closed, said main body further comprising a generally cylindrical outer wall extending in axial direction and two generally planar end walls extending generally perpendicular to the outer wall, wherein at least one of said end walls is formed such that at least a portion thereof is axially displaced upon a change in pressure of the hydraulic fluid in the chamber.

Preferably, the end wall consists of an alternating array of relatively rigid portions maintaining their shape and relatively elastic portions providing for displacement, wherein the end wall is preferably circular and consists of a concentric array of at least one relatively elastic ring providing for displacement and a relatively rigid circular center portion maintaining its shape.

The braking system according to the present invention preferably comprises at least one such actuation/working element.

In particular, the hydraulic actuation system is filled with hydraulic fluid and comprises at least one actuation element which upon actuation can cause a change in pressure of the hydraulic fluid, at least one working element which will be displaced in response to the change in pressure of the hydraulic fluid, and a connecting conduit for hydraulic fluid connecting the actuation element with the working element.

This simple hydraulic actuation system is versatile, very reliable and comparatively extremely inexpensive to manufacture.

According to a preferred embodiment of the present invention, the actuation element and the working element may be formed identically.

In a very simple way, a valve may be provided which may control or block the flow of hydraulic fluid in the connecting conduit. For example, if the connection conduit is an at least partly elastic connection tube, the valve may comprise at least one eccentric element which may be used to pinch off the connecting tube.

The above mentioned parts and possibly also other or further parts may form, or result in, a combination kit of hydraulic elements. The various elements may be combined easily. Actuation element(s) or working element(s) may be connected to a connection conduit by simply slipping on and sealing by means of a fixing ring. In a very simple manner, branched systems or systems having multiple circuits may be devised. The elements of the hydraulic element combination kit may be standardized resulting in cost-effective production and warehousing.

The hydraulic actuation system and the actuation/working element according to the present invention may find particularly advantageous application in a braking system for rollers or wheels, such as rollers or wheels for inline skates.

Conventional inline skates have either no braking feature at all or they usually have a braking block, for example made of rubber, mounted behind the last wheel of an inline skate. The conventional provisions for braking are very much insufficient and prone to accidents.

In order to brake using a conventional braking block the respective inline skate or roller skate must be tilted toward the back whereby in effect only the other skate is used for rolling which is particularly difficult for beginners and often results in accidents and injuries. Even with perfect control or mastering of the inline skates only little braking effect may be achieved using the conventional braking block, in particular on wet or uneven surfaces. Further, the braking block is exposed to high wear and must be replaced relatively often.

Furthermore, the conventional braking system consists of a large number of components which are attached to the inline skate or roller skate partly in a complicated manner such as by joints or links. Further, the braking block builds out beyond the inline skate, i.e. it protrudes towards the back, which may often be hindering. Therefore, the braking block is sometimes removed which further increases the dangers of inline skating.

In contrast, the hydraulic actuation system and the braking system of the present invention obviates all drawbacks of the prior art. It provides a technically perfect brake and actuation system by a simple cost-effective closed system. Contrary to a conventional actuation by means of wire cables, the system of the present invention has no interior friction, and branching off is easily achieved for multiple actuations or for systems having multiple circuits. The system of the present invention is free of wear and maintenance, has a long expected lifetime, provides high safety, consists of few parts only, may be retrofitted, is small, compact and easy to integrate. Due to the system being closed, there is no leaking fluid. In short, the present invention affords high tech at low cost.

Besides the application in a braking system for rollers or wheels, particularly for inline skates, the following exemplary applications for the hydraulic actuation system of the present invention are considered: actuation of chair or seat adjustment, gear change/transmission, bicycle brake, as well as every kind of actuation of lockings or remote controls/actuations.

A braking system for rollers or wheels preferably comprises a braking element for engagement with the roller or wheel, a hydraulic actuation system arranged for acting on the braking element, and an abutment for supporting the working element of the hydraulic actuation system. In accordance with a preferred embodiment of the present invention, the abutment is formed by a chassis or frame in which the rollers or wheels are rotatably mounted.

Advantageously, the braking system comprises a return spring for returning the braking element into its rest position spaced from the roller or wheel after braking engagement with the roller or wheel wherein the return spring may be formed integrally with the braking element.

Another advantageous embodiment of the braking system includes a temperature warning system which emits a warning upon excessive increase of temperature at the braking element. The warning is provided by means of at least one optical signal emitter, such as one or more light emitting diodes (LEDs), and/or an acoustic signal emitter. For example in a mobile application, the power supply for the temperature warning system may be provided by a commercially available button battery (pocket calculator battery). In a preferred embodiment, a switch is coupled with the actuation system such that the switch is actuated or switched upon actuation of the actuation system and activates the temperature warning system. Preferably, a temperature sensor is provided for sensing the heating of the braking element which sensor being arranged in close proximity to the braking element wherein the temperature sensor may be a temperature sensitive resistor, for example.

According to the present invention, a so-called anti-flattening system or anti-blocking system is provided as will be described in more detail hereinafter with reference to FIGS. 40–44. Therein, the braking system comprises a braking element for engagement with the roller or wheel, an actuation element arranged for acting on the braking element, and a viscous brake arranged between said braking element and said actuation element, said viscous brake allowing defined entrainment of the braking element by the roller or wheel to be braked.

A preferred embodiment of the viscous brake comprises a stationary housing, a follower connected to the braking element and rotatable with respect to the housing, at least one inner engagement disc, and at least one outer engagement disc, wherein the housing together with the follower defines a chamber in which said at least one inner engagement disc and said at least one outer engagement disc are arranged and which is filled with a viscous fluid, said inner engagement disc and said outer engagement disc being arranged such that they are rotated with respect to each other upon relative rotation between said housing and said follower. For example, said at least one inner engagement disc is in engagement with said follower and said at least one outer engagement disc is in engagement with said housing. Preferably, the follower is formed integrally with said braking element.

The braking element may be ring-shaped for maximum frictional engagement For improved cooling effect, the braking element may comprise a plurality of cooling fins.

Preferably, the braking system described herein will find applications in braking of rollers or wheels of inline skates.

BRIEF DESCRIPTION OF THE DRAWINGS

Further features, advantages and objects of the invention will become apparent from the following detailed description of preferred embodiments with reference to the drawings.

FIG. 4 is an exploded top plan view of the hydraulic actuation system of FIG. 1;

FIG. 5 is an exploded side view of the hydraulic actuation system of FIG. 3;

FIG. 12 is an enlarged sectional view of the working element in an actuated condition according to FIG. 10;

FIG. 13 is an enlarged sectional view of the actuating element in an actuated condition according to FIG. 10;

FIG. 14 is an enlarged side view of the working element in an actuated condition according to FIG. 11;

FIG. 15 is an enlarged side view of the actuating element in an actuated condition according to FIG. 11;

FIG. 11);

FIG. 11);

FIG. 20 is a top plan view of an alternative embodiment of the hydraulic actuation system;

FIG. 21 is a side view of the hydraulic actuation system of FIG. 20;

FIG. 35 is a schematic front plan view of another implementation of the hydraulic actuation system as a wheel or roller brake, for example applied to roller skates or inline skates;

FIG. 36 is a schematic side view of the implementation according to FIG. 35;

FIG. 37 is a schematic front plan view of another implementation of the hydraulic actuation system as a wheel or roller brake, for example applied to roller skates or inline skates;

FIG. 38 is a schematic side view of the implementation according to FIG. 37;

FIG. 42 is a perspective view of the arrangement of FIG. 41 in an assembled condition;

FIG. 43 is a front plan view of the arrangement of FIG. 42;

FIG. 44 is a side view of the arrangement of FIG. 42;

DETAILED DESCRIPTION OF THE INVENTION

Figure 1:
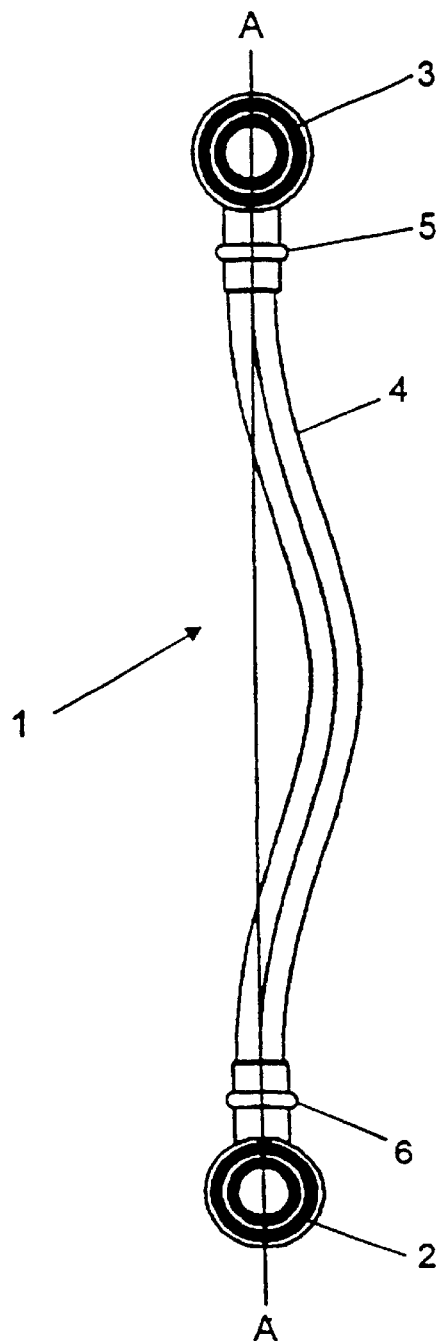
FIG. 1 is a top plan view of a first embodiment of a hydraulic actuation system, in a rest position.

In FIG. 1, there is shown a top plan view of a first embodiment of the hydraulic actuation system 1, in a rest position. The hydraulic actuation system 1 essentially comprises three parts or portions, namely an actuation element 2, a working element 3, and a connecting tube 4.

The actuation element 2 may be identical to the working element 3. Further, these two elements are generally exchangeable in their functions. Actuation of the actuating element 2 will cause a reaction in the working element 3 and vice versa.

The structure of the actuation element 2 and of the working element 2 as well as details thereof will be described hereinafter with reference to FIGS. 9–12. It should be noted, however, that the actuation element 2 as well as the working element 3 are preferably formed integrally or as a single piece. Elastomers or elastic thermoplastics or duroplastics having a hardness of approximately 65°–75° Shore (A) are particularly adapted for use as materials from which the actuation element 2 or the working element 3 are formed. Depending on the field of application, other materials or a multi-piece implementation are possible. In particular, the use of different materials and/or different structures may be advisable if the actuation element 2 and the working element 3 are not formed identically.

The connecting tube 4 is preferably made of an elastic bendable thermoplastic material. The thermoplastic material may also be transparent. The thermoplastic material has a greater hardness than the material of the actuation element 2 or the working element 3, preferably approximately twice the hardness thereof, so as to provide reliable axial attachment and shape maintaining ability of the connecting tube 4 as well as reliable sealing between the connecting tube 4 on the one hand and the actuation element 2 or the working element 3 on the other hand.

Inasmuch as flexibility of the connecting tube 4 is not required or desired, the connecting tube may be replaced by a rigid pipe having otherwise the same properties as the connecting tube.

Figure 2:
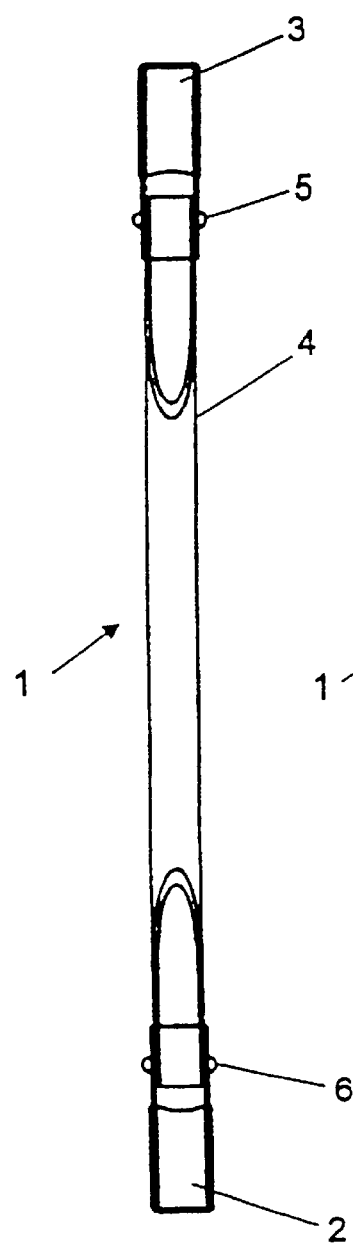
FIG. 2 is a sectional view of the hydraulic actuation system along line A—A in FIG. 1, in a rest position.

As may be seen from FIG. 2, connection between the connecting tube 4 and the actuation element 2 or the working element 3, respectively, is achieved by inserting one end of the connecting tube 4 in a telescopic manner into a socket or port of the actuation element 2 or the working element 3, respectively. A fixing ring 5, 6 which is preferably made by turning or stamping is applied over the socket or port and secures it on a respective end of the connecting tube 4 by means of tight engagement, i. e. by radial pressure. At the same time, reliable sealing is provided between the respective socket or port of the actuating element 2 or the working element 3, respectively, and the connecting tube 4, said sealing being sufficient for the expected pressures. By means of the fixing ring 5, 6, the connection between the connecting tube 4 and the actuation or working element 2, 3 can be made or disconnected in an extremely simple manner. Preferably, the fixing ring 5, 6 is first slid onto the socket or port of the actuation element 2 or working element 3, respectively, and then the connecting tube 4 is inserted into the respective socket or port.

Preferably, at least one end of the connecting tube 4 is conically thickened or flared with this kind of connection between the connecting tube 4 and the actuating element 2 or working element 3, respectively, so as to reliably avoid pulling the connecting tube 4 out of the connection with the actuation element 2 or the working element 3 using the fixing rings 5, 6. The conical thickening or flare is preferably thermoplastically integrally formed on one end or both ends of the connecting tube 4.

Of course, with correspondingly chosen materials for the socket or port and for the connecting tube it would also be possible to reverse the relative arrangement of these two parts such that an end of the connecting tube were to be slid over the socket or port and the fixing ring were to be applied onto the end of the connecting tube.

It should be noted that the fixing ring 5, 6 is preferably a detachable ring showing essentially no yield or elongation upon application of pressure. For example, the fixing ring 5, 6 is made of metal, preferably of steel. Due to the detachability of the ring 5, 6, the connected elements may easily be disconnected. The modular structure of the hydraulic actuation system having detachable elements presents a large degree of freedom in designing a system or in use, or when exchanging used or broken parts.

Moreover, a man skilled in the art will perceive a large number of other techniques for connecting the connecting tube with the actuation element and the working element in a reliable and tight manner, such as by bonding or gluing.

The such formed actuation system comprising the actuation element 2, the connecting tube 4 and the working element 3 is filled completely with hydraulic fluid Any known or commonly used hydraulic fluid may be used; however, for reasons of environmental protection and cost, it is preferred to use a hydraulic fluid on the basis of water. Preferably, the hydraulic fluid is sterilized for long-term stability. For facilitated filling, the hydraulic fluid may contain an additive for decreasing surface tension (surfactant).

Figure 8:
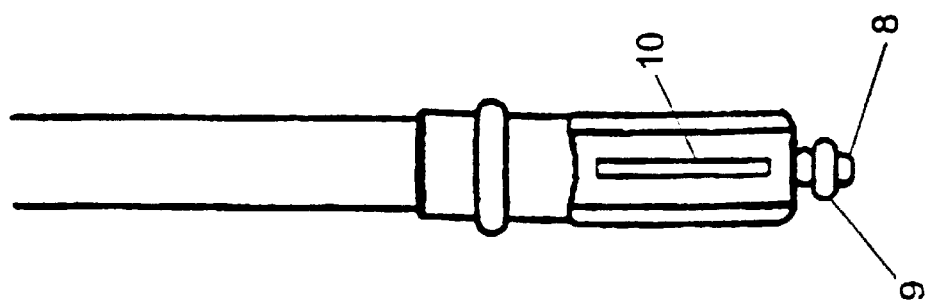
FIG. 8 is a side view corresponding to FIG. 6.
Figure 7:
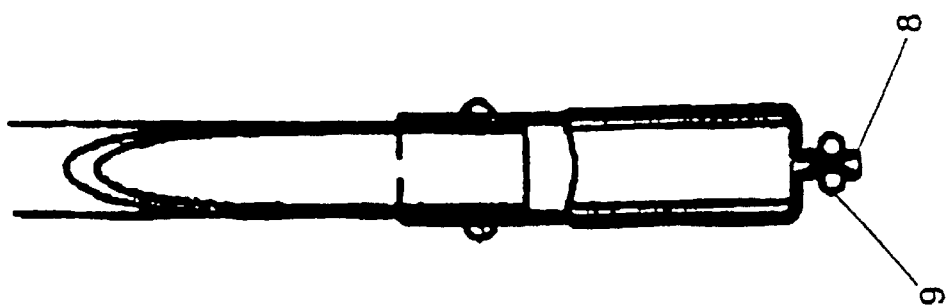
FIG. 7 is a sectional view along line B—B in FIG. 6.
Figure 6:
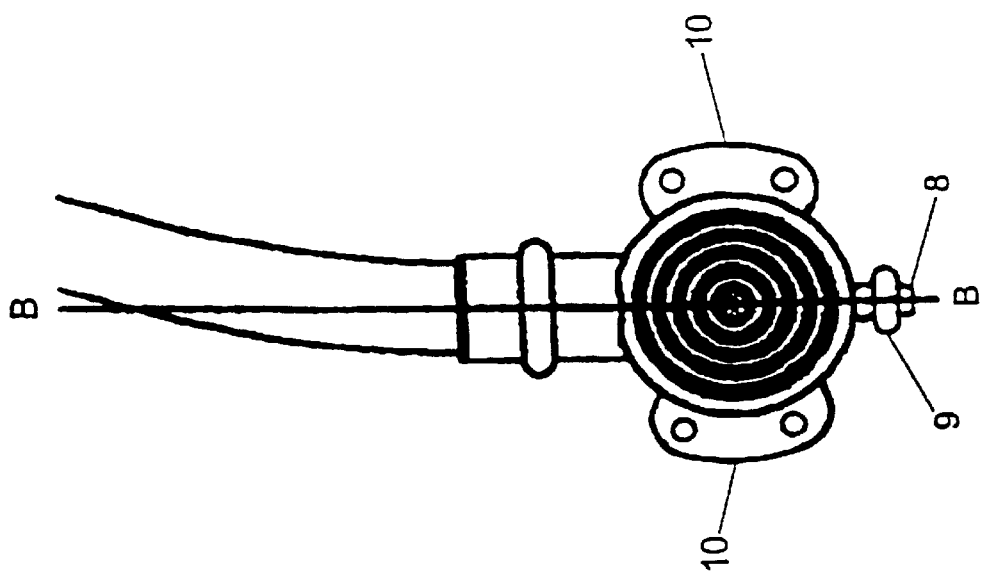
FIG. 6 is a partial view of a hydraulic actuation system according to another embodiment.

As can be seen in FIGS. 6–8, for filling or venting of the hydraulic actuation system 1, a filling or venting socket or port 8 may be provided on at least one of the elements used, said filling or venting socket or port 8 being preferably integrally formed with the corresponding element and which socket or port may be closed by means of a simple sealing and closing ring 9 similar to the fixing ring 5, 6. In this manner, the filling or venting socket or port may be opened and closed an a very simple manner.

As shown in FIGS. 6 and 8, the actuation element and/or the working element may be provided with lateral mounting flanges 10 for mounting and aligning or centering of the actuation element or working element, respectively, said flanges being preferably formed integrally with the actuation or working element The mounting flange(s) may be formed corresponding to the desired application or use wherein a skilled man may choose from a variety of possibilities. In particular, it should be noted that the mounting flanges 10 shown in FIGS. 6 and 8 are only one preferred exemplary embodiment for reasons of explanation.

Figure 3:
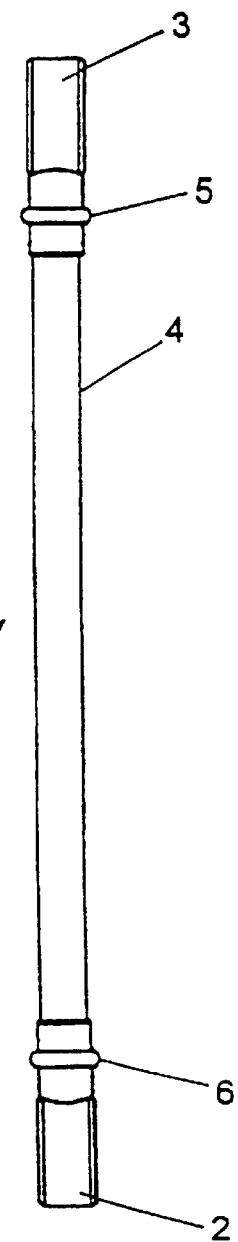
FIG. 3 is a side view of the hydraulic actuation system of FIG. 1.

While the actuation element 2 and the working element 3 are shown in FIGS. 1–3 in the same alignment, it is clear that any desired orientation of these two elements with respect to each other is possible, depending on the requirements of the particular application. Generally, the relative position of these two elements with respect to each other may be changed at any time due to the flexible connection tube 4, if necessary even during operation of the hydraulic actuation system 1.

FIGS. 4 and 5 show a top planar view and a side view, respectively, of an exploded illustration of the above described hydraulic actuation system 1. Here, the individual components of the hydraulic actuation system 1 may easily be recognized.

Figure 9:
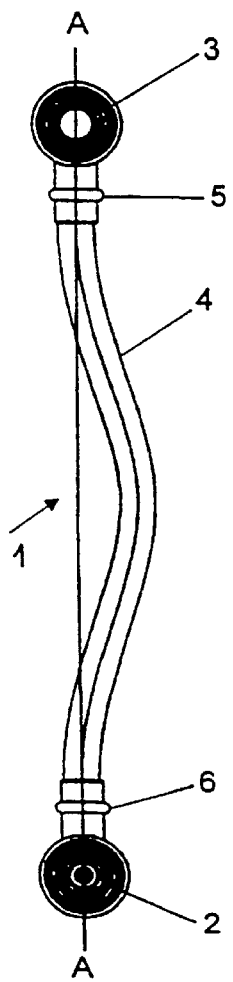
FIG. 9 is an illustration similar to FIG. 1, however, in an actuated condition.
Figure 10:
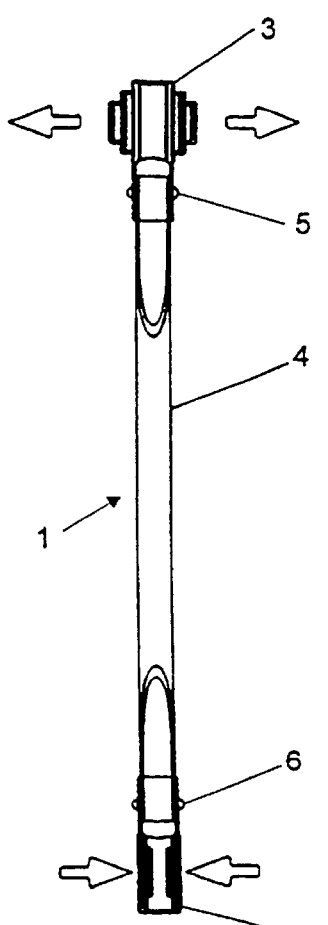
FIG. 10 is an illustration similar to FIG. 2, however, in an actuated condition.
Figure 11:
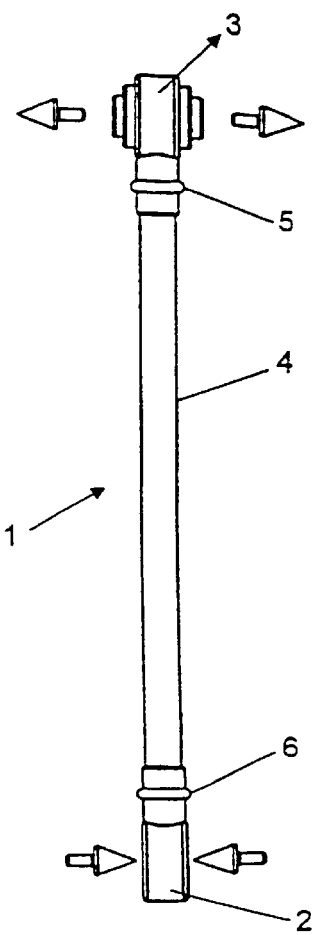
FIG. 11 is an illustration similar to FIG. 3, however, in an actuated condition.
Figure 16:
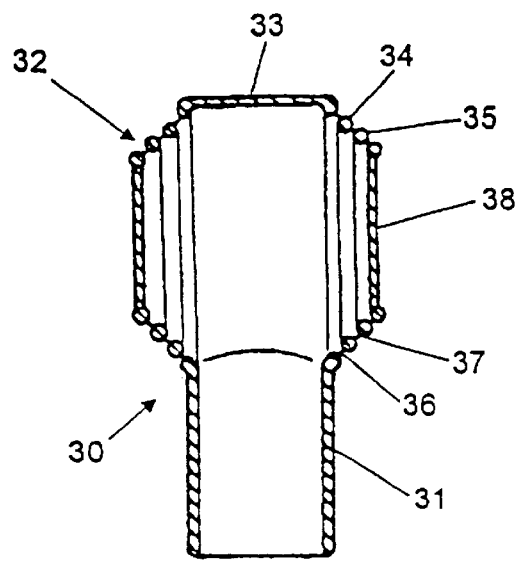
FIG. 16 is an enlarged sectional view of an alternative working element in an actuated condition according to FIG. 10.
Figure 18:
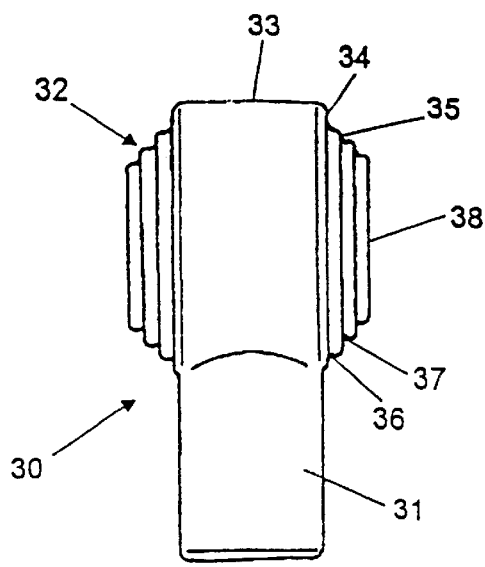
FIG. 18 is an enlarged side view of the alternative working element according to FIG. 16 in an actuated condition (cf.

FIGS. 9–11 are similar to FIGS. 1–3 and show the hydraulic actuation system 1 in an actuated condition. The actuating element 2 is axially compressed, causing a corresponding axial expansion of the working element 3. In this context, it is again reminded that the functions of the actuation element and of the working element are mutually exchangeable. Thus, it would also be possible to compress element 3 such that element 3 now acted as the actuation element. This would cause an expansion of element 2 such that this element 2 now acted as the working element.

FIGS. 12–15 show the actuation element or working element, respectively, in more detail. In FIGS. 12 and 14, a working element 30 is depicted in an actuated or "extended" condition. The working element 30 comprises a socket or port 31 which normally is connected to the connecting tube. The socket or port 31 is connected to a main body 32 of the working element 30 and is preferably integrally formed therewith. The main body 32 of the working element 30 comprises portions 33, 34, 35 having shape-maintaining properties, preferably having shape-maintaining geometry or increased thickness of material, said portions preferably being annular and providing stabilization. Further, the main body 32 of the working element 30 also comprises portions 36, 37 having elastic properties for providing displacement, preferably having elastic geometry providing displacement or decreased thickness of material, thus enabling "extension" of the main body 32. Moreover, it is preferred that the round central piston portion 38 of the main body 32 is also shape-maintaining, be it by the chosen geometry or by the chosen material.

In FIGS. 13 and 15, an actuation element 20 is shown in an actuated or "retracted" condition. The actuation element 20 comprises a socket or port 21 which is normally connected to a connecting tube. The socket or port 21 is connected to the main body 22 of the actuation element 20 and is preferably integrally formed therewith. The main body 22 of the actuation element 20 comprises portions 23, 24, 25 having shape-maintaining properties, preferably having shape-maintaining geometry or increased thickness of material, said portions preferably being annular and providing stabilization. Further, the main body 22 of the actuation element 20 also comprises portions 26, 27 having elastic properties for providing displacement, preferably having elastic geometry providing displacement or decreased thickness of material, thus enabling "retraction" of the main body 22. Moreover, it is preferred that the round central piston portion 28 of the main body 22 is also shape-maintaining, be it by the chosen geometry or by the chosen material.

Figure 17:
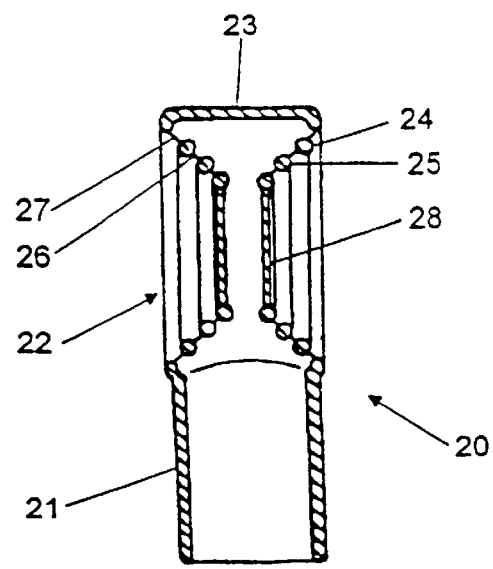
FIG. 17 is an enlarged sectional view of an alternative actuating element in an actuated condition according to FIG. 10.
Figure 19:
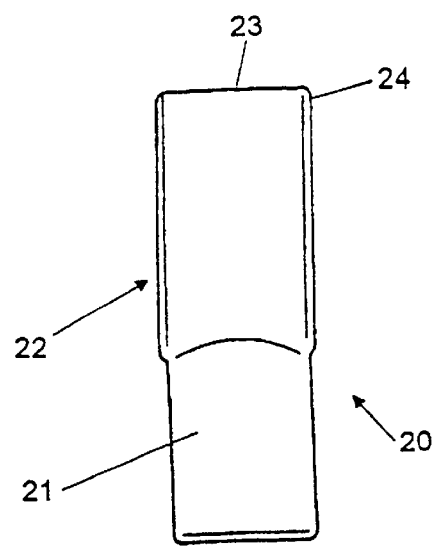
FIG. 19 is an enlarged side view of the alternative actuation element according to FIG. 17 in an actuated condition (cf.

FIGS. 16–19 show an alternative embodiment of an actuation element, namely in an "extended" condition (FIGS. 16 and 18) and in a "retracted" condition (FIGS. 17 and 19). Similar to the preceding embodiment of FIGS. 12–15, the working element 30 comprises a socket or port 31 which is normally connected to a connecting tube. The socket or port 31 is connected to a main body 32 of the working element 30 and is preferably integrally formed therewith.

The main body 32 of the working element 30 comprises portions 33, 34, 35 having shape-maintaining properties, preferably having shape-maintaining geometry or increased thickness of material, said portions preferably being annular and providing stabilization. Further, the main body 32 of the working element 30 also comprises portions 36, 37 having elastic properties for providing displacement, preferably having elastic geometry providing displacement or decreased thickness of material, thus enabling "extension" of the main body 32. Moreover, it is also preferred that the round central piston portion 38 of the main body 32 is also shape-maintaining, be it by the chosen geometry or by the chosen material.

As mentioned before, the actuation elements and the working elements may be identical and are then completely exchangeable. Indeed, it is only the actual use of the hydraulic actuation system which of the elements is the actuation element (action) and which is the working element (reaction). For example, the directional retraction of an element may represent a reaction, e. g. if the desired direction is not pressure or movement toward the outside (with respect to the respective element) but if pulling or movement toward the inside (with respect to the respective element) is desired.

Since in many applications, it is merely necessary to obtain a directional working effect, the actuation element may comprise any other construction or structure as long as hydraulic actuation of the working element is achieved. An important aspect of the present invention is thus the particular design of the actuation element and working element, respectively.

The main body 22, 32 of the actuation and working elements 20, 30 comprises a portion 23, 33 having shape-maintaining properties, said portion forming an essentially cylindrical axial outer wall of the main body 22, 32. As is shown clearly in FIGS. 12–19, the outer wall 23, 33 remains substantially unchanged with respect to shape and position at any time, independent of whether the main body 22, 32 is in the "retracted" position (FIGS. 13, 15, 17, and 19) or in the "extended" condition (FIGS. 12, 14, 16, and 18). This is important for obtaining directional movement.

In contrast, at least one of the end walls of the main body extending essentially perpendicular to the desired direction of movement or actuation is formed such that directional extension and retraction is possible. This may be achieved by means of an alternating concentric array of relatively rigid rings maintaining their shape and relatively elastic rings providing for displacement as is shown in FIGS. 12–19. However, it would also be possible, for example, to provide one or both end walls completely as an elastic membrane, so that upon actuation a more concave or convex deformation results.

According to a preferred embodiment, the elastic properties of the portions providing for displacement may provide a (self) return function for the hydraulic actuation system 1 into a neutral balanced condition in which the end walls of the main body are not displaced, thus preferably being generally flat or planar. This return function, however, is not necessarily present, and if desired it is also possible to provide no return function.

Moreover, it should be noted that for one-sided direction of working, one of the end faces of element 20, 30 may be formed relatively rigid and shape-maintaining, similar to the cylindrical outer wall 23, 33 such that only the opposite end wall can be extended or retracted.

For use with higher pressures, it may be advantageous to reinforce the shape-maintaining portions of the elements 20, 30, for example through embedding of insert parts or element, e. g. made of metal.

Element 20, 30 is manufactured preferably as a single piece by means of an appropriate injection molding method. However, also a multi-piece structure and other manufacturing methods are possible.

In the following, advantageous modifications and variants of the system are described.

FIGS. 20 and 21 are a top plan view, and a side view, respectively, of an alternative embodiment of the hydraulic actuation system. Here, for example, the working element 3a is larger than the actuation element 2 wherein otherwise the working element 3a may be identical to the working element 3 of the preceding embodiment. Because of the rules of hydraulic "leverage", thereby a configuration may be achieved in which for example the displacement or path at the actuation element is large and the force is small whereas at the working element the displacement or path is small and the force is large. Such a configuration would be advantageous when used in braking systems. Of course, depending on the particular application, it is also possible to make the actuation element larger than the working element so as to achieve the opposite results.

Figure 22:
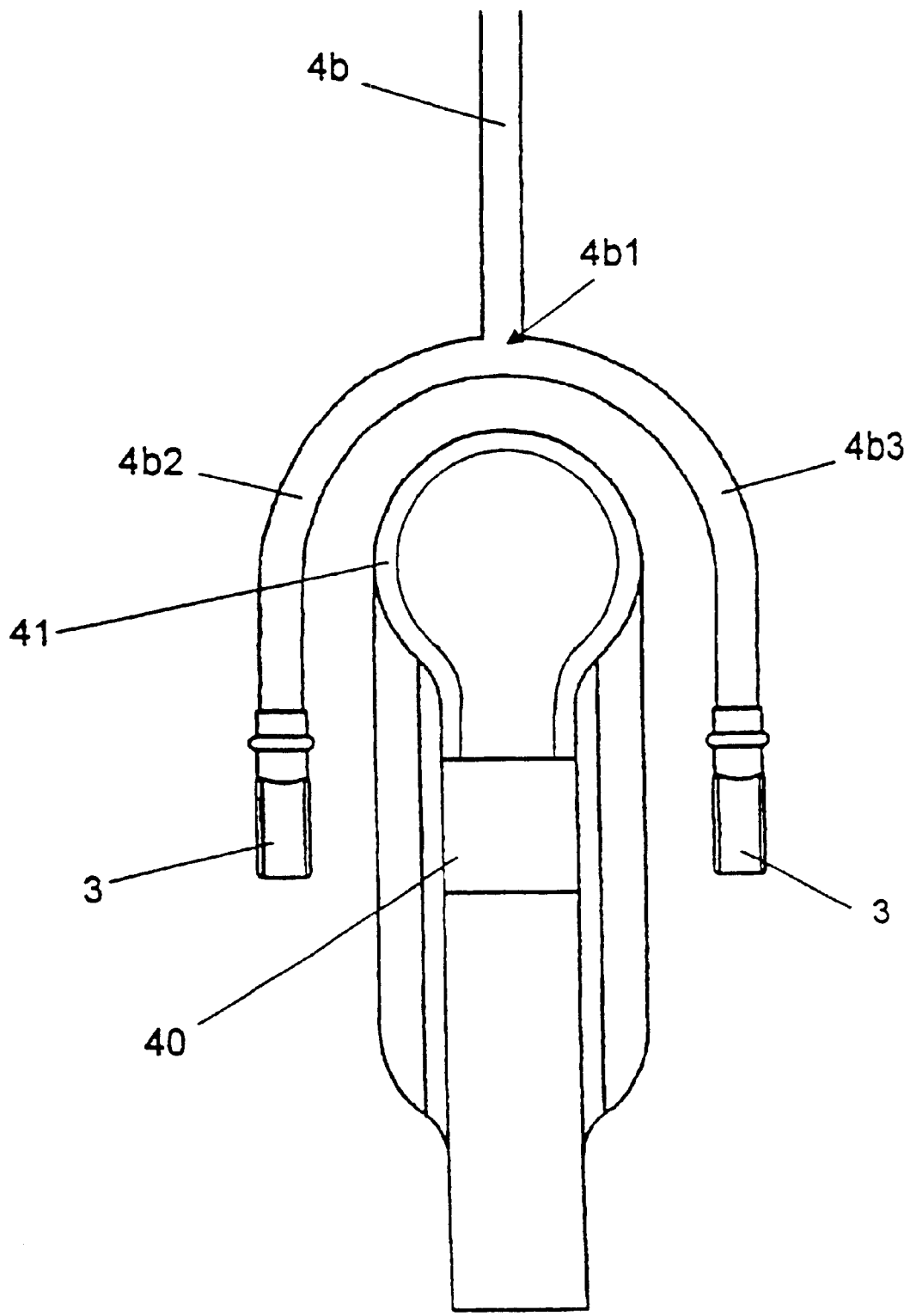
FIG. 22 is a schematic illustration of another embodiment of the hydraulic actuation system wherein a branching-off is provided and an application of the hydraulic actuation system e. g. as a bicycle brake is shown.

FIG. 22 shows another embodiment wherein a branch or fork is provided and where the application of the hydraulic actuation system of the present invention for use as a bicycle brake is illustrated. According to the known principles, the hydraulic system may be branched or forked, dividing the action according to the division or distribution rules. The hydrostatic distribution of forces makes this simple kit system very versatile. In the simplest case, the action or effect may be divided by tow identical branches into two identical parts. The division into a plurality of branches as well as differing division may easily be achieved by respective measures known to a man skilled in the art. Thus, in a very simple manner, a uniform distribution of forces in the individual branches is achieved which would be extremely difficult or even impossible when using e. g. wire cables or similar conventional mechanical force transmission systems. Moreover, in the hydraulic actuation system, the interior friction is practically zero, whereas large frictional forces are present in wire cables. Using the hydraulic actuation system, large distances of action may easily be bridged with little or no friction.

In the embodiment according to FIG. 22, the connection tube 4b coming from an actuation element (not shown) forks at a manifold 4b1 into two branches 4b2 and 4b3 at each end of which a working element 3 is attached. In the embodiment shown as a bicycle brake, a bicycle rim 40 with a bicycle tire 41 mounted thereon is arranged between the working elements 3. In order to complete the bicycle brake, a braking element or a braking block would be arranged between each working element 3 and the rim 40, and the side of each working element 3 positioned toward the outside would abut against a fixed support (e. g. mounted to the front fork or the frame of the bicycle) as is clear to a man skilled in the art.

The hydraulic actuation system may also be equipped with control and/or closed-loop control mechanisms in a simple manner. In order to render the system simple, the hydraulic system should preferably remain a dosed system.

Figure 23:
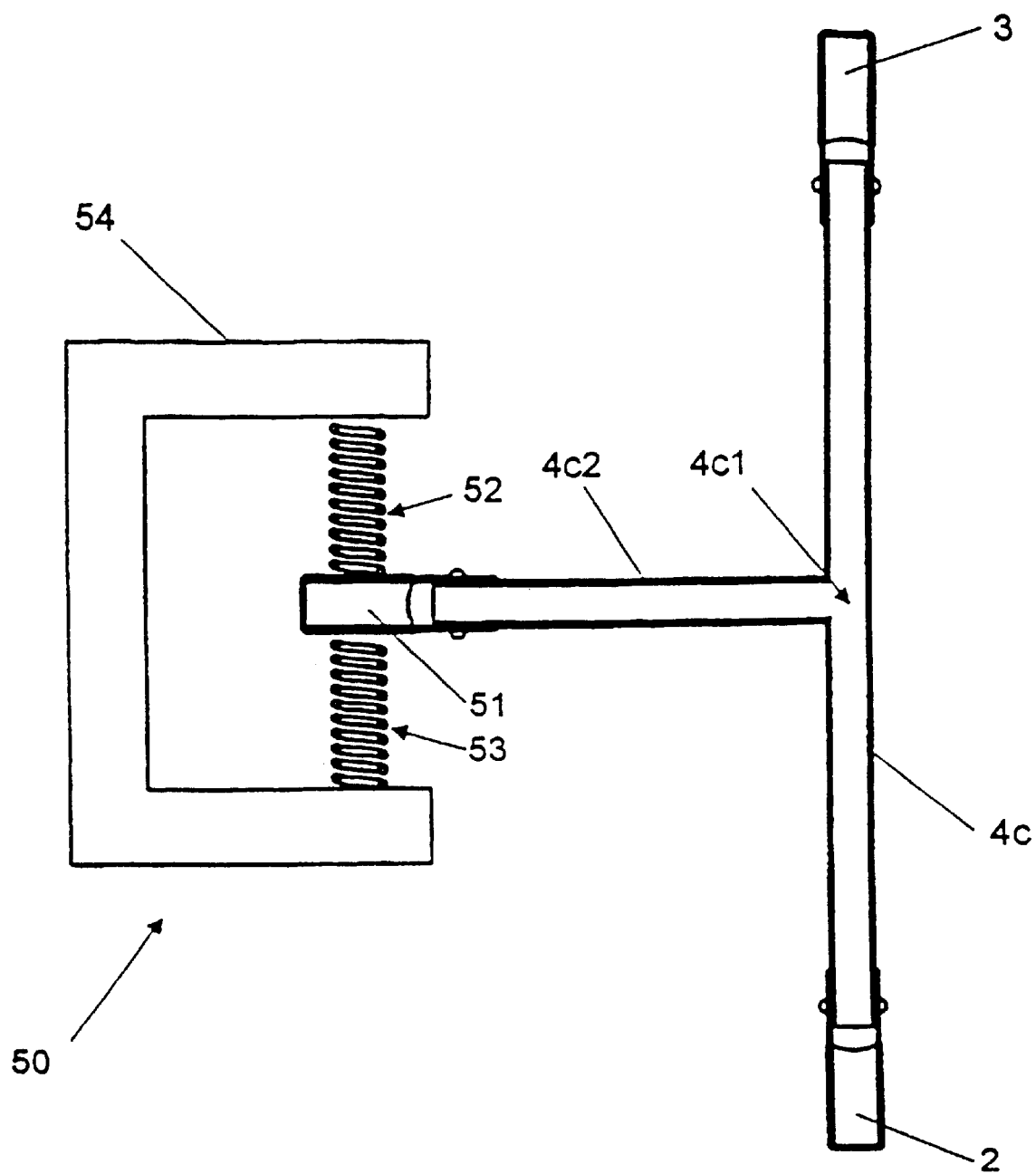
FIG. 23 is a schematic illustration of yet another embodiment of the hydraulic actuation system according to the present invention wherein a force limiter is provided as a pressure relief force limiter for the system.

In FIG. 23, another embodiment of the hydraulic actuation system is shown wherein here a force limiter is provided as a pressure relief force limiter for the system. Therein, the connecting tube 4c is provided with a manifold 4c1 between the working element 3 and the actuation element 2, one branch 4c2 being directed from said manifold 4c1 to a force limiter 50. The force limiter 50 may be integrated into present components or housings and is preferably of a design wherein a control element 51 at the end of branch 4c2, which control element 51 may be identical to the working element 3 or the actuating element 2, acts on at least one compression spring 52, 53 which abuts against a stationary frame 54 which may advantageously be incorporated in already present components or housings, as mentioned above. The resulting force limiter acts linearly infinitely variable. By using detent or latch elements, also a stepped force limitation can be achieved. Further, it is possible to use a stronger version of an actuation or working element only (i. e. without springs 52, 53 or frame 54) as a control element for limiting force.

Figure 24:
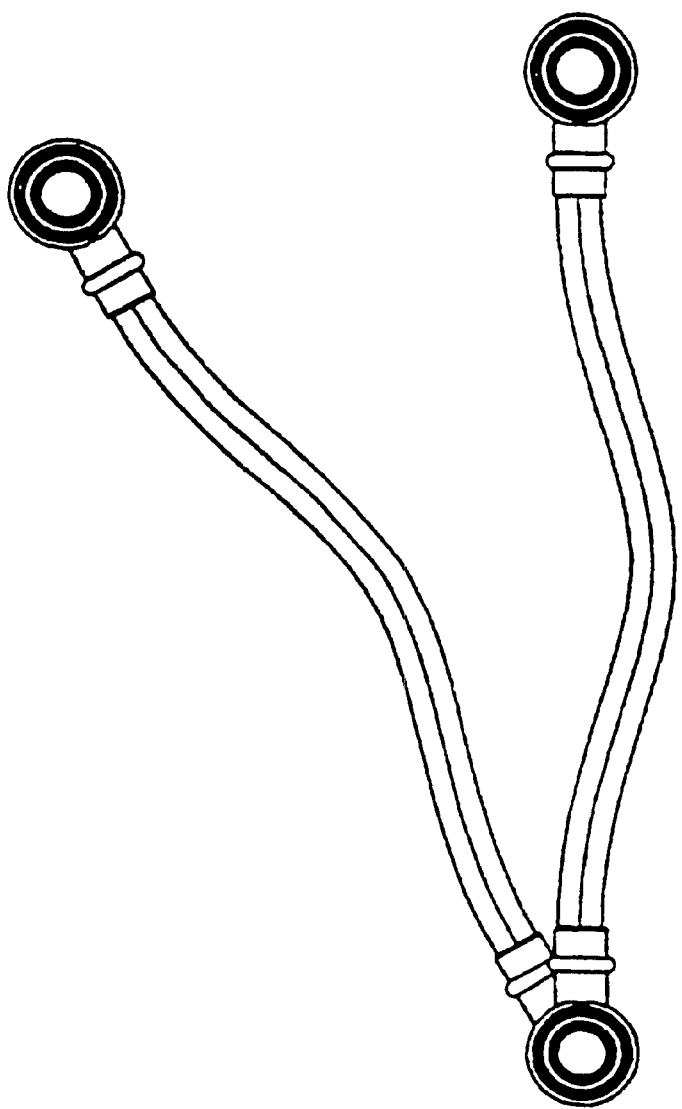
FIG. 24 is a top plan view of a first embodiment of a combination of two hydraulic actuation systems of FIG. 1, forming a two-circuit system.
Figure 25:
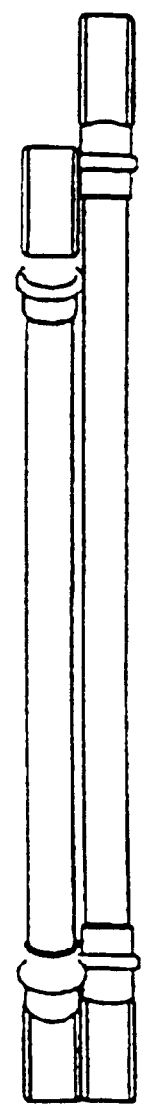
FIG. 25 is a side view of the embodiment of FIG. 24.

Several hydraulic actuation systems may be combined in any desired way. FIGS. 24 and 25 show a dual circuit system having two hydraulic actuation systems according to FIG. 1 as an example for a combination of plural hydraulic actuation systems. By arranging the two actuation elements 2 side by side, they can be actuated together by a single actuation so as to achieve corresponding reaction in the working elements 3 which are arranged separately from each other. For example, in a dual circuit braking system, increased safety by redundancy may be achieved. The combination shown in FIGS. 24 and 25 could also be used as an alternative to the system shown in FIG. 22. As mentioned above, of course, a combination is also possible in which two working elements are arranged side by side and wherein the two actuation elements are arranged separate from each other.

Figure 26:
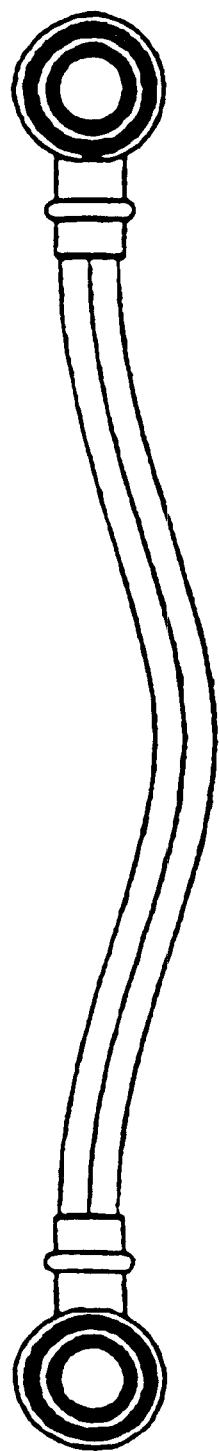
FIG. 26 is a top plan view of a second embodiment of a combination of two hydraulic actuation systems of FIG. 1, forming a two-circuit system.
Figure 27:
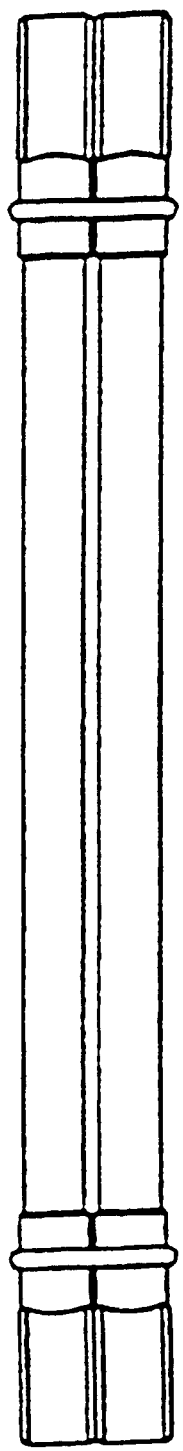
FIG. 27 is a side view of the embodiment of FIG. 26.

In the embodiment of FIGS. 26 and 27, two hydraulic actuation systems according to FIG. 1 are combined such that the actuation elements 2 as well as the working elements 3 are arranged side by side and are actuated together or react together, respectively. In this way double safety or double displacement (actuation and/or reaction) can be achieved in a very simple structure of the system.

Figure 28:
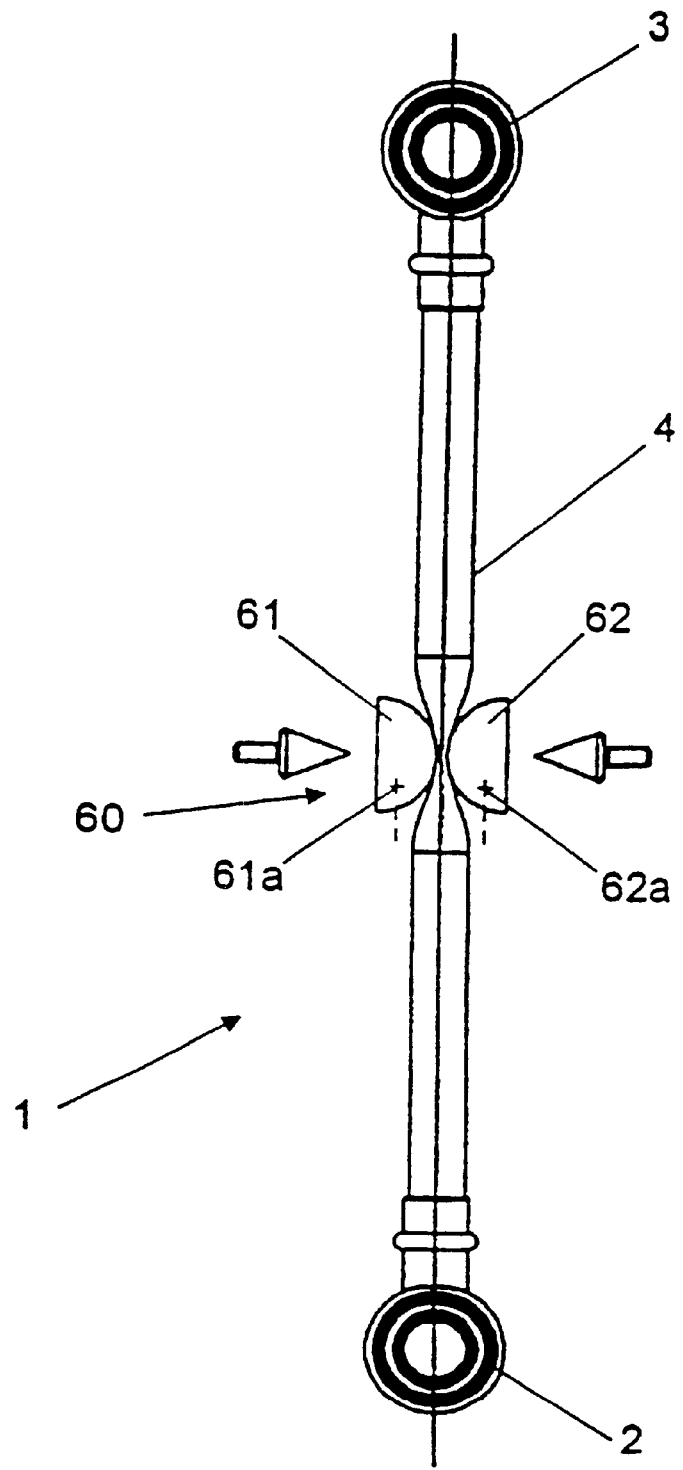
FIG. 28 is a top plan view of another embodiment of the hydraulic actuation system, having a valve for throttling or blocking the hydraulic flow in the connecting tube.

Additional possibilities for control or closed-loop control may be achieved by simple throttling, preferably infinitely variable, or by completely blocking of the connecting tube. In FIG. 28, there is shown an embodiment of the hydraulic actuation system having a valve for throttling or blocking of hydraulic flow in the connecting tube. The valve 60 is, for example, at least one but preferably a pair of eccentric elements 61, 62, preferably made of plastic, including a self blocking feature, said eccentric elements rotating about respective rotation axes 61a and 62a whereby e. g. when completely blocking the connection tube 4 the hydraulic actuation system may be stopped or fixed in any desired state of actuation. Thus, for example when using the hydraulic actuation system in a braking system, by an extremely simple valve a fixed brake can be realized in that the connecting tube is blocked when the brake is actuated or applied, or the braking system can be switched off if the connecting tube is blocked with the brake being released.

Figure 29:
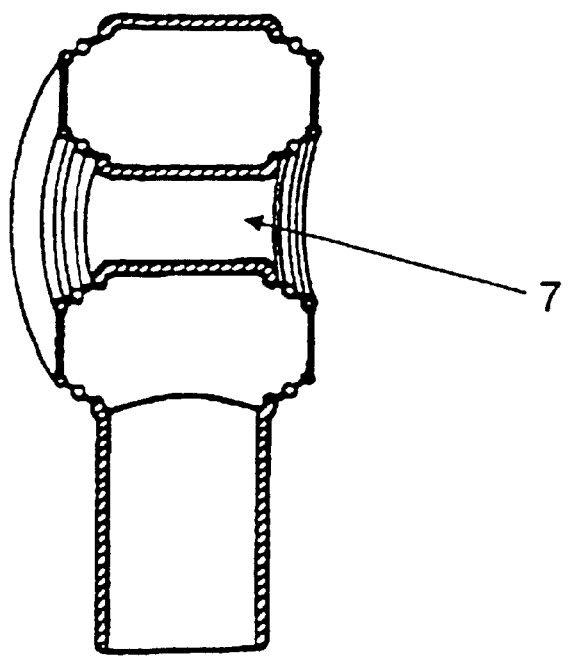
FIG. 29 is a schematic sectional view of yet another embodiment of the actuation element or working element, respectively, for the hydraulic actuation system wherein the actuation element or the working element, respectively, comprises an axial central through-hole for coaxial actuation, and is shown in the "extended" condition.
Figure 30:
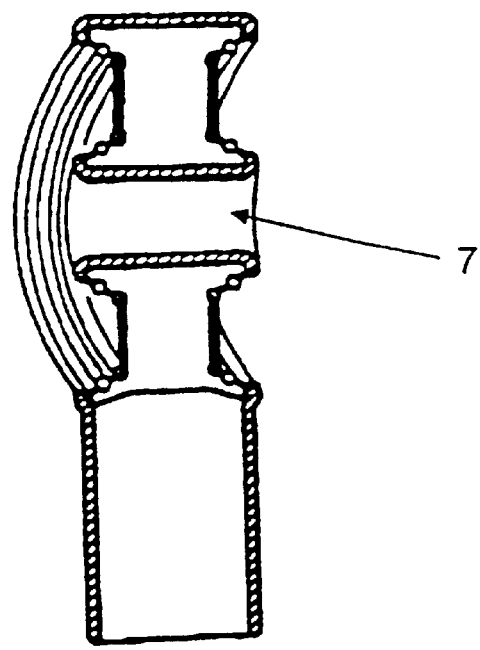
FIG. 30 is a schematic sectional view of the actuating element or working element of FIG. 29 wherein the element is shown in the "retracted" condition.

FIGS. 29 and 30 show another embodiment of an actuation or working element of the hydraulic actuation system 1 wherein the actuation element and the working element, respectively, comprise an axial central through-hole 7 for coaxial applications. Of course, in an implementation of the hydraulic actuation system either one of the working element and the actuation element may comprise an axial central through-hole 7 for coaxial applications while the other of the two elements may be formed e. g. as shown in FIGS. 1–19, or both elements comprise the axial opening or through-hole 7.

In the embodiment of the element having a central opening 7, the element also comprises a socket or port which normally is connected to a connecting tube. The socket or port is connected to the main body of the element and is preferably formed integrally therewith. Similar to the elements shown in FIGS. 12–19, the main body of the element according to FIGS. 29 and 30 comprises portions having shape-maintaining properties, preferably with shape-maintaining geometry or having increased thickness of material, which portions being preferably annular and providing stabilization. Different from the elements shown in FIGS. 12–19, however, the main body comprises a portion having shape-maintaining properties which forms a generally cylindrical axial interior wall of the main body defining the opening 7, in addition to the generally cylindrical axial outer wall of the main body having shape-maintaining properties. Between the axial ends of the inner and outer walls, a preferably odd number of concentric annular portions having shape-maintaining properties, preferably with shape-maintaining geometry or increased thickness of material, is provided which are connected to one another by means of portions having elastic properties providing for displacement preferably with elastic geometry providing for displacement or having a decreased thickness of material, between each two adjacent portions having shape-maintaining properties. Thereby, directional extension and retraction of the element is enabled, the ring positioned in the middle between the inner wall and the outer wall being subject to the largest displacement upon actuation of the element.

Thus, also in the embodiment of FIGS. 29 and 30 at least one of the end walls of the main body arranged generally perpendicular to the desired direction of movement or actuation is formed such that directional extension or retraction is possible since the axial inner and outer walls of the main body are relatively rigid and are not substantially deformed or displaced. As described above, the end walls may be formed, for example, as an alternating concentric array or arrangement of relative rigid ring having shape-maintaining properties and relative elastic rings providing for displacement, as is shown in FIGS. 29 and 30. However, it would also be possible, for example, to provide one or both annular end walls completely as an elastic membrane, so that upon actuation a more concave or convex deformation results.

Figure 29A:
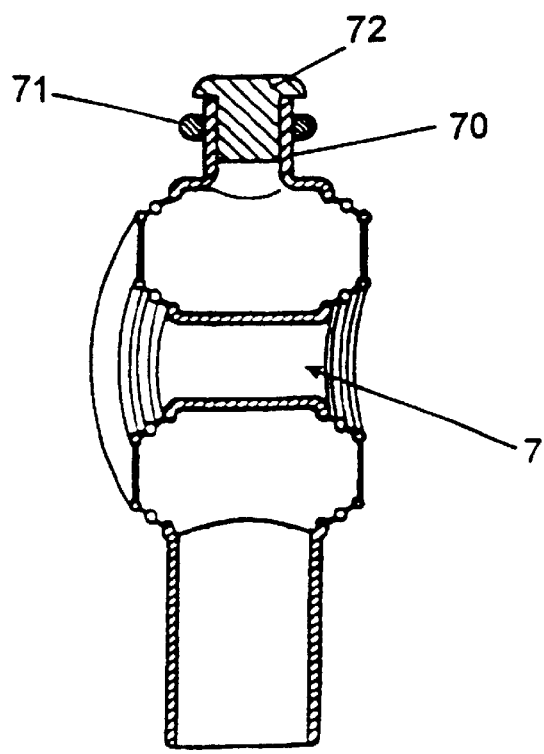
FIG. 29A is a modification of the actuation element or working element of FIG. 29.
Figure 30A:
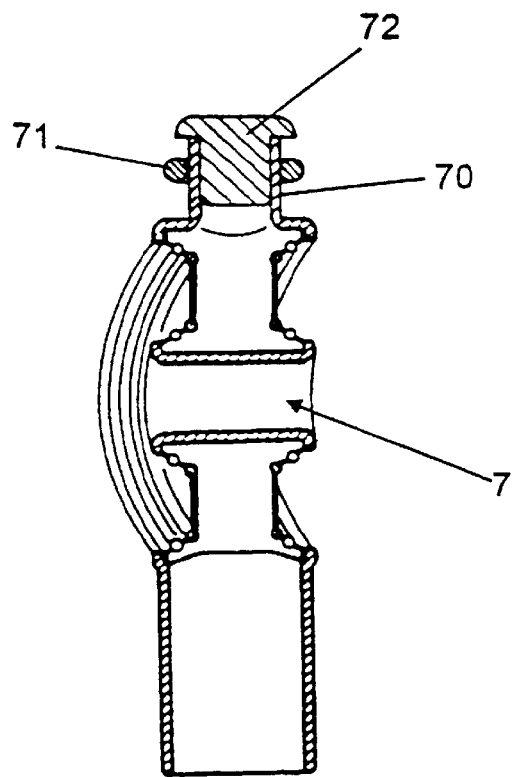
FIG. 30A is a modification of the actuation element or working element of FIG. 30.

In FIGS. 29A and 30A a modification of the actuation element and working element, respectively, similar to those shown in FIGS. 29 and 30 is shown. However, in the embodiments of FIGS. 29A and 30A, an additional socket or port 70 is provided at the outer wall of the actuation and working elements. This socket or port 70 may be used for filling or venting. Another advantage of the socket or port 70 is that it provides additional access to the interior of the actuation and working elements, respectively, substantially facilitating the manufacturing thereof, e. g. by injection molding.

In an operating state of the actuation and working elements, the socket or port 70 is closed e. g. by a plug 72 which may be secured or clamped within the socket or plug 70 by means of a fixing ring 71 placed onto the socket or port 70.

FIGS. 31–39 show implementations of the hydraulic actuation system for use as a wheel or roller brake, in particular for inline skates.

Figure 31:
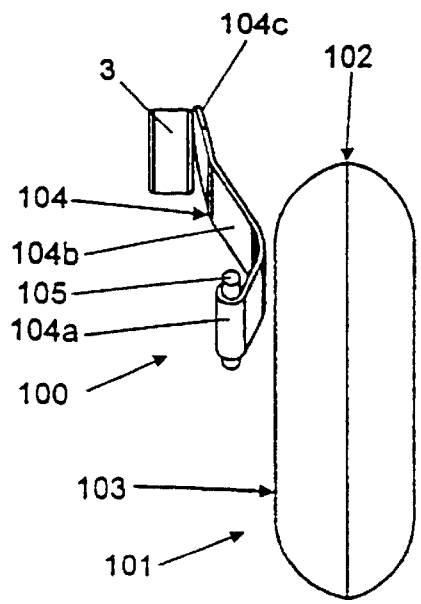
FIG. 31 is a schematic front plan view of an implementation of the hydraulic actuation system as a wheel or roller brake wherein the hydraulic actuation system is in a rest condition.
Figure 32:
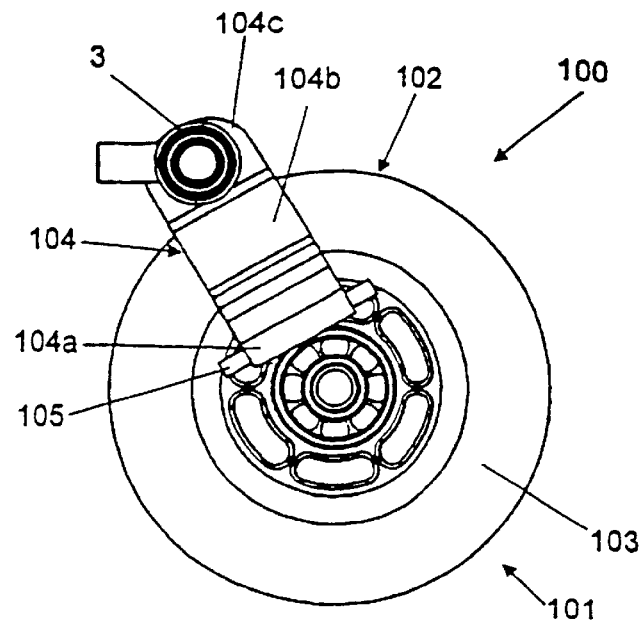
FIG. 32 is a schematic side view of the implementation of the hydraulic actuation system as a wheel or roller brake.
Figure 33:
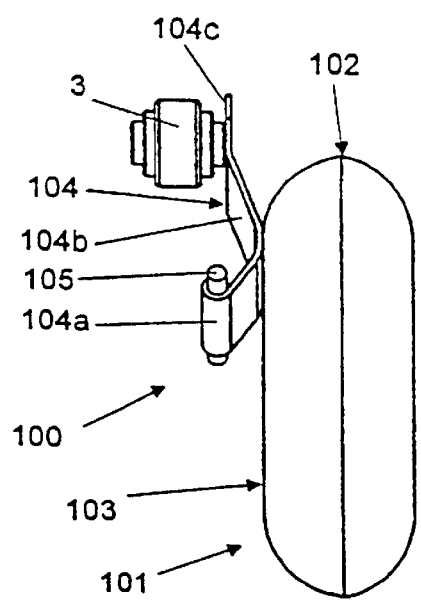
FIG. 33 is a schematic front plan view of the implementation of the hydraulic actuation system as shown in FIG. 31 as a wheel or roller brake wherein the hydraulic actuation system is in an actuated or braking condition.
Figure 34:
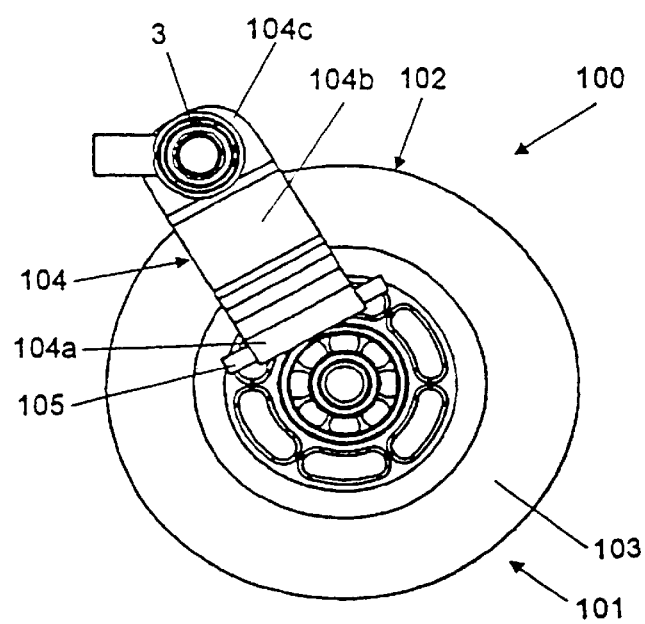
FIG. 34 is a schematic side view of the implementation of the hydraulic actuation system as a wheel or roller brake in an actuated or braking condition.

As may be seen from FIGS. 31 and 32, a first embodiment of a braking system 100 comprises a wheel or roller 101 having a running surface 102 and a side surface 103. A braking element 104, preferably formed from stamped sheet metal, has a configuration including multiple bends and is supported at one end 104a. If formed from stamped sheet metal, support or fixation by means of a pin 105 is optimal. The pin could also be formed integrally with the braking element; for example, the pin could be formed by stamping and bending in case of the stamped sheet metal embodiment The braking element 104 is pivotable around the pin 105 such that an arcuate central portion 104b of the braking element 104 which is proximate to the wheel 101 may come into engagement with the wheel. Pivoting of the braking element 104b is obtained by means of a working element 3, e. g. from the hydraulic actuation system of FIG. 1, said working element 3 coming into engagement with the other (distal) end 104c of the braking element 104. Releasing of the brake may be achieved for example by a spring (not shown) acting on the braking element or by the return forces of the hydraulic actuation system. FIGS. 33 and 34 show the braking system of FIGS. 31 and 32 in an actuated or braking condition. As is clear to the skilled man, the working element 3 requires an abutment or support in order to be able to apply a force onto the braking element 104 upon actuation. In a roller skate or inline skate, this support or abutment may easily be formed by the frame or chassis in which the axles of the rollers 101 are supported and which is omitted in the illustrations of FIGS. 31–39 for reasons of simplicity.

In FIGS. 35 and 36, an implementation of the hydraulic actuation system is shown as applied to a wheel or roller brake, for example in roller skates or inline skates. Here, for example, all four rollers of a roller skate are braked wherein each one working element 3 acts on two braking elements 104 so as to brake two rollers 101. However, it would also be possible to incorporate the two braking elements 104 into a single braking element, or to use one single braking element for all four rollers or wheels. Other configurations are also conceivable and possible.

FIGS. 37 and 38 depict a braking system for inline skates similar to the one shown in FIGS. 35 and 36, however, in this case for each roller 101 a separate braking system 100 is provided. Each braking system 100 shown in FIGS. 37 and 38 could be identical to the braking system shown in FIGS. 31–34.

In accordance with the principle explained with reference to FIGS. 22 or 24–25, the working elements 3 of FIGS. 35–38 may be actuated by a single actuation element, or a multi-circuit system may be provided such that each working element has its own actuation element associated therewith wherein the actuation elements are preferably actuated together (cf. FIGS. 24 and 25).

Figure 39:
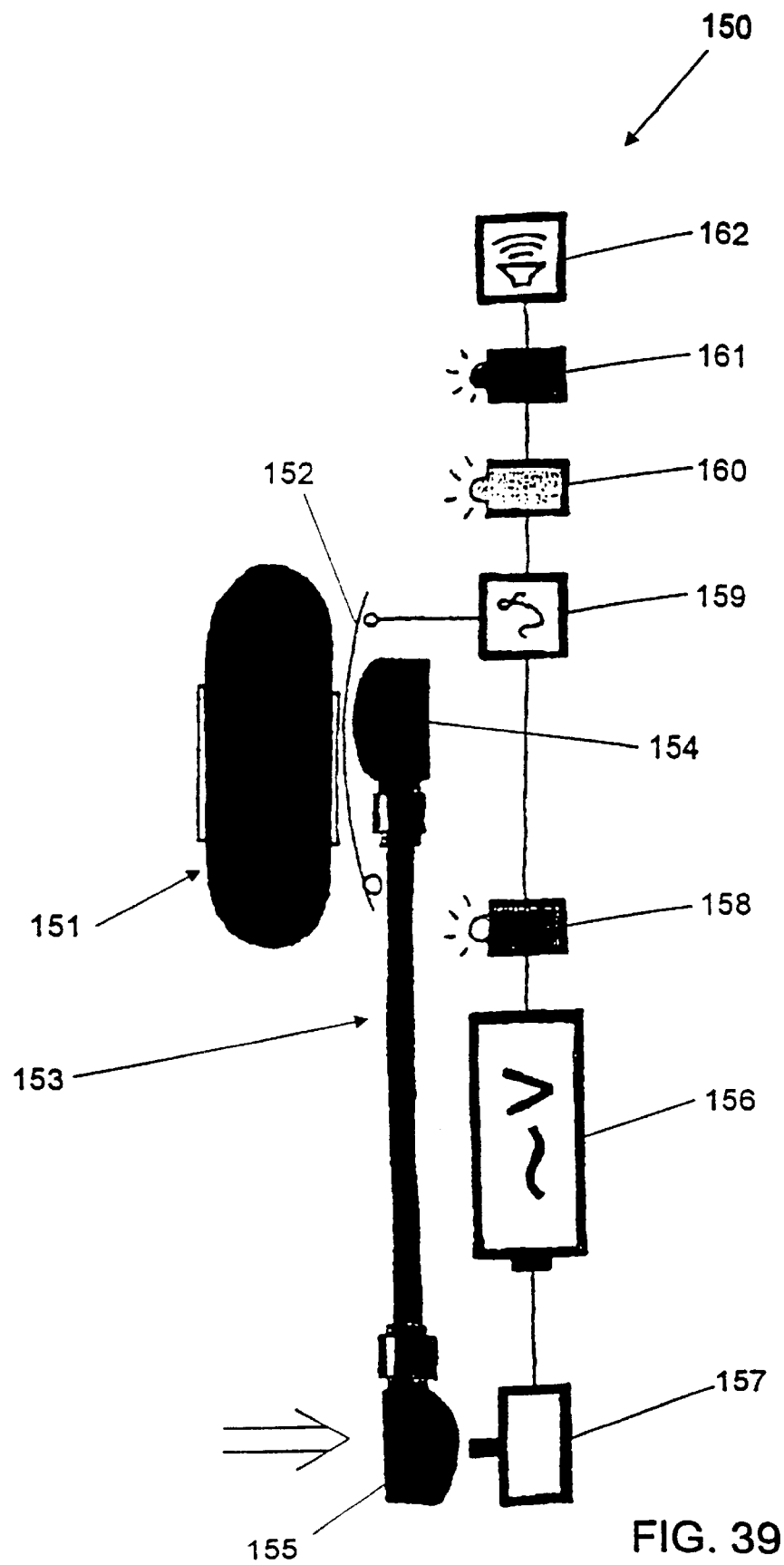
FIG. 39 shown another implementation of the hydraulic actuation system as a wheel or roller brake, for example applied to roller skates or inline skates, comprising additionally a temperature warning system (thermo control system)

FIG. 39 shows another advantageous implementation of the hydraulic actuation system. In addition to a braking system, for example similar to the one shown in FIGS. 31–38, a temperature warning system 150 is provided. The temperature warning system, also referred to as thermo control system or TCS, is used to avoid excessive heating of the braked wheels (due to heat produced by friction during braking). In the embodiment of FIG. 39 a wheel 151 is being braked. Any desired wheels and any number of wheels may be braked and provided with a TCS.

The suggested TCS has a very simple structure and may be realized in a very small space using low cost components.

A braking element 152, for example similar to the braking element 104 according to FIGS. 31–38, is mounted such that it can be brought into braking engagement with the wheel 151 by means of a working element 154 of an actuation system 153 which may be similar to the hydraulic actuation system 1 of FIGS. 1–3. Preferably, the braking element 152 comes into engagement with a side surface of the wheel 151.

Upon actuation of the actuation element 155 of the actuation system 153, the working element 154 is actuated such that the wheel 151 is braked through the braking element 152. During braking, the braking element 152 and the braked wheel 151 are heated. This heating must be kept within certain limits since the wheel or the braking element are made of a not very temperature resistant material and may be damaged Further, the braking force is reduced upon heating.

Since the TCS is preferably used in mobile applications, for example in roller skates or inline skates, it is preferred to use a power supply 156 for the TCS which is also mobile such as a (rechargeable) battery. In view of the limited space in or on the chassis of an inline skate, a button battery (pocket calculator battery) is preferred as the power supply 156.

In order to use as little energy as possible, the TCS 150 (and the power supply 156) is preferably switched on only during braking. This may easily be achieved in that a switch is coupled with the actuation system. In the embodiment shown in FIG. 39, a switch 157 is coupled with the actuation element 153 such that the switch 157 is switched upon actuation of the actuation element 155, and activates the TCS. Activation of the TCS 150 may be indicated e. g. by a LED 158. In accordance with a preferred embodiment, the LED 158 is green to indicate an appropriate condition.

As mentioned above, by braking the wheel 151 and the braking element 152 are heated. Heating of the braking element 152 is sensed or detected by a temperature sensor 159 arranged on the braking element 152.

The temperature sensor 159 could be a temperature sensitive resistor coupled to a circuit which may produce signals as the resistor reaches certain resistance values.

For example, at a raised but not yet critical temperature of the braking element 152, a signal may be sent to another LED 160 which may preferably be yellow and the illumination of which indicates a warning. When the temperature is further increased due to continued braking, another signal may be sent to a third LED 161 which may preferably be red and the illumination of which indicates a critical condition in which damage to the wheel and loss of braking force is possible. In addition to the red LED 161, also an acoustic signaling device 162 may be actuated so as to attract additional attention.

The embodiment shown illustrates a certain arrangement of various elements using several LEDs 158, 160, 161 and an acoustic signaling device 162. However, it is merely essential that the TCS gives a warning upon excessive increase of temperature of the braking element, be it by acoustic, optical or other signaling devices, in order to avoid damage to the wheel due to excessive temperature.

All components used in the embodiment of FIG. 39 are low in cost and may be integrated in a very small space such that the use thereof in inline skates, for example, is readily possible without affecting the skating characteristics or the optical appearance of the inline skates.

A big problem, occurring in particular when braking rollers of inline skates, is that the rollers can slip or slide or even block during braking and are thus worn or abraded in an irregular manner. When a roller is blocked during braking and slips or slides on the ground, the running surface is locally strongly abraded and flattening of the running surface occurs such that the roller no longer runs true and must be replaced. This flattening of the running surface is referred to as flattening.

In order to avoid flattening, the wheel may therefore not block or slide during braking. Put differently, the dynamic braking force applied to each wheel may never exceed the dynamic braking force acting between the road surface and the wheel which is maximally possible for avoiding sliding.

The braking system according to the present invention is based on the consideration that the static friction ($F_H = \mu_H \times F$) between an object such as a wheel or a roller and the ground is larger than the corresponding sliding or dynamic friction ($F_G = \mu_G \times F$), or put differently, $\mu_H > \mu_G$. On the other hand, the possible dynamic transmission of braking force between the wheel and the ground (road) changes together with the rolling speed, namely the maximum braking force increases with increasing rolling speed.

A special situation occurs when the rolling speed of the wheel is smaller than the moving speed of the wheel over ground. For example, this may be the case when a slowly spinning or non-rotating wheel is moved with high speed over ground without contacting the ground surface and then hits the ground and is brought into contact with the ground surface. This scenario occurs for example with the landing gear of a landing airplane or with roller skates or inline skates where one or more rollers (or wheels) temporarily have no contact with the ground and during this phase reduce their spinning or rolling speed or even come to a standstill.

Now, when in such a situation the wheel hitting the ground is braked, the force transmitted by the ground contact must not only compensate the inertia forces of the wheel in order to bring the wheel to a rolling speed corresponding to the ground speed, but also a braking force applied to this wheel is transmitted This accumulation of forces is normally larger than the dynamic force which can be transmitted between the wheel and the ground surface causing the wheel to slide. When the wheel slides, flattening occurs as mentioned above. In order to avoid flattening, at low spinning or rolling speeds of the wheel, only a small braking force should be applied to this wheel in order to minimize or even eliminate sliding of the wheel. With increasing rotational or rolling speed, also a larger force can be transmitted between the wheel and the ground such that the braking force applied to the wheel may be increased correspondingly with increasing rotational or rolling speed without the wheel sliding.

Similar to what has been mentioned above with respect to friction between the wheel and the ground, this is also true in principle for the friction between the braking element and the wheel. When the wheel is braked and loses ground contact or has no ground contact in the first place, the wheel will quickly come to a standstill. Then, there is a static friction between the braking element and the wheel, which static friction is larger than the dynamic or sliding friction of the other wheels. Since all wheel have the same braking force, the previously unloaded wheel will remain blocked upon renewed ground contact and will be flattened.

Figure 40:
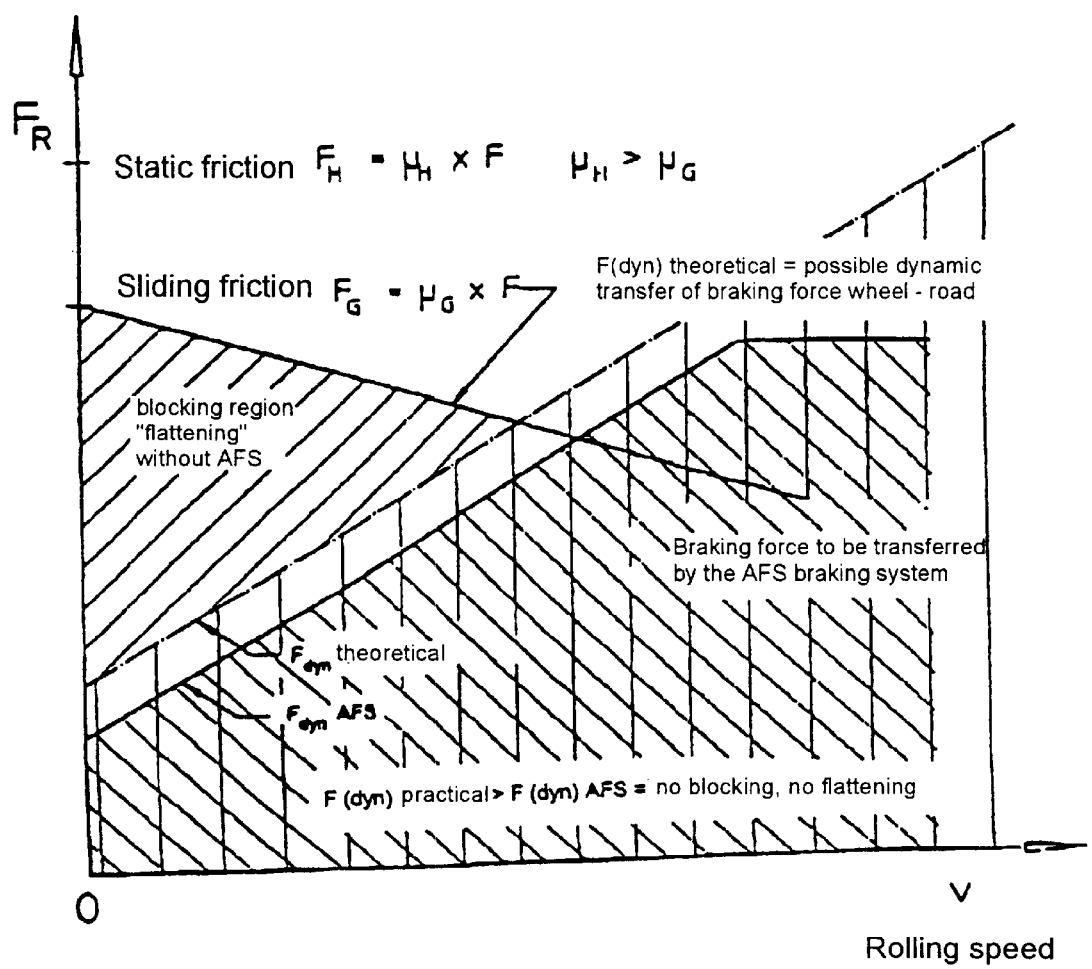
FIG. 40 is a graph illustrating the braking force characteristics with rollers of inline skates.

FIG. 40 is a graph illustrating the characteristics of braking force of a wheel or roller. In the left half of the graph, there is shown a region designated "blocking region". Here, not the entire braking force applied may be transmitted to the ground or road surface; the braking would be too strong and the wheel would block. On the other hand, in the lower part of the graph there is a region below the dot-and-dash line which marks the transmission of maximum braking force which is theoretically possible between wheel and road surface, designated "$F_{dyn}$ theoretical"; in this region, the entire braking force may be transmitted to the road, the wheel does not block or slide and no flattening occurs. Subtracting a safety margin, a region for a braking system results which is below the line designated "$F_{dyn}$ AFS".

Based on these considerations, a braking system was developed which operates in this admissible region, namely which brakes little or weakly at low rotational or rolling speed and which brakes much or strongly at high rotational or rolling speed. Such a braking system may be called an ant-flattening system (AFS) or an anti-blocking system (ABS) since it avoids reliably flattening or blocking of the wheels.

It was found that the required conditions are ideally fulfilled by a viscous braking system. However, it is also possible to use systems based on centrifugal forces or throttle pump systems. It is important to note that the braking force obtainable at low rotational or rolling speeds is small and increases with increasing rotational or rolling speed of the wheel and remains in the admissible region according to FIG. 40, i. e. below the line designated "$F_{dyn}$ AFS".

Figure 41:
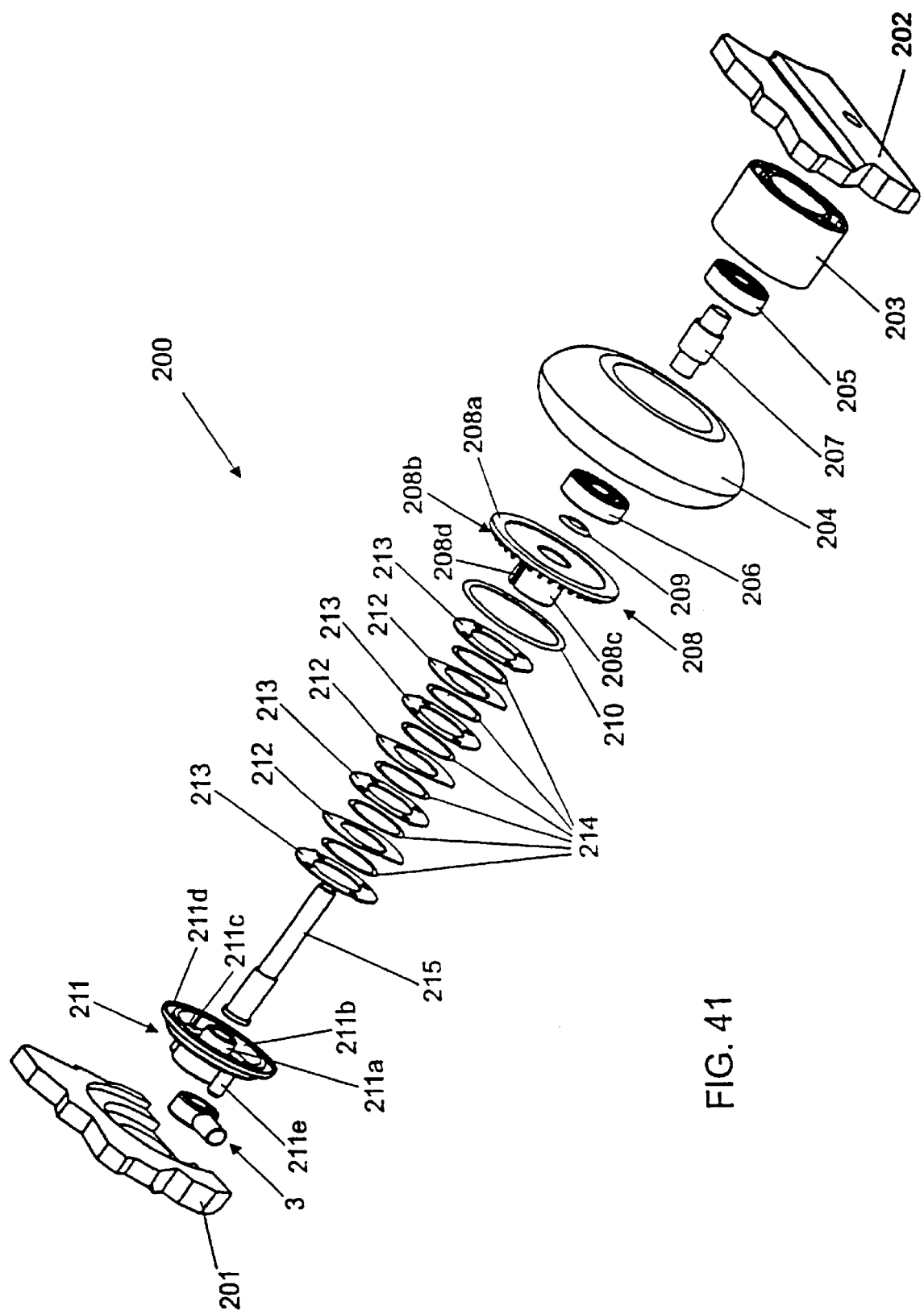
FIG. 41 is an exploded perspective view of another implementation of the hydraulic actuation system as a wheel or roller brake in accordance with the present invention, for example applied to roller skates or inline skates, in combination with a viscous braking system providing an anti-flattening or anti-blocking functionality for the wheel.

FIG. 41 is an exploded perspective view of a wheel or roller brake such as for roller skates or inline skates, in combination with the viscous braking system 200 of the present invention providing an anti-flattening or anti-blocking functionality for the wheel. Preferably, the above described hydraulic actuation system may be used.

In particular, in FIG. 41 left and right parts 201, 202 of the chassis of a roller skate or inline skate are illustrated A wheel rim 203 carries a wheel 204. The rim 203 is supported by two ball bearings 205, 206 which in turn are arranged on a spacer sleeve 207. In the assembled condition, the rim 203, the ball bearings 205, 206 and the spacer sleeve 207 are disposed within the wheel 204.

The AFS braking system itself comprises a follower 208. The follower 208 is preferably made of steel using MIM technology (MIM=Metal Injection Molding). An outer ring 208a of the follower 208 is provided for engagement with the wheel 204 so as to apply a braking force to the wheel 204 by means of friction. On the back side of the outer ring 208a, along the entire circumference of the follower 208, there is provided a plurality of radial ribs or fins 208b for stabilization and cooling of the outer ring 208a. The follower 208 further comprises a tubular projection or stub 208c in which at least one but preferably two axial grooves 208d are formed. The grooves 208d serve for engagement with projections on at least one inner engagement discs yet to be described.

A return spring 209 is provided between the bearing of the wheel 204 and the AFS, i. e. in particular between the ball bearing 206 mounted on the spacer sleeve 207 and the follower 208. The return spring 209 is provided for releasing or removing the follower 208 from the wheel 204 after terminating the braking process so as to assure free running of the wheel 204 when the AFS is not actuated. Any appropriate spring element may be used as the return spring 209. It is preferred to use a spring washer or a Belleville spring washer as the return spring 209, as shown in FIG. 41.

A seal ring 210 is provided between the follower 208 and a clutch housing 211 for sealing therebetween. The clutch housing 211 is preferably made of steel using MIM technology (MIM=Metal Injection Molding). The clutch housing 211 comprises a tubular central projection or stub 211a fitting into the tubular projection 208c of the follower 208. The tubular projection 211a of the clutch housing 211 together with an annular outer wall 211b forms a toroidal chamber for accommodating clutch discs. On the radial interior of the outer wall 211b at least one and preferably two axial grooves 211c are formed for engagement with at least one outer engagement disc which is yet to be described. An annular groove 211d for receiving the seal ring 210 is provided on the radial exterior of the outer wall 211b at the side of the clutch housing 211 facing the follower. On the side facing away from the follower 208, the clutch housing 211 has at least one axially projecting pin 211e which, together with at least one opening in the chassis, forms a locking device for the clutch housing 211 against rotation.

In the clutch housing 211, there are alternatingly arranged at least on inner engagement disc 212 engaging said follower 208 and at least one outer engagement disc 213 engaging the clutch housing 211.

The inner engagement disc 212 comprises a circular central opening into which the tubular projection 208c of the follower 208 may be inserted. At least one projection projects radially into the central opening of the inner engagement disc, said projection corresponding to the groove(s) in the tubular projection 208c of the follower with respect to number, position and size. Preferably, the contour of the inner engagement disc is formed of two opposite arc sections connected by two secants. Preferably, the inner engagement disc 212 is made of steel.

The outer engagement disc 213 also comprises a circular central opening into which the tubular projection 208c of the follower 208 may be inserted. However, there are no projections in the central opening of the outer engagement disc 213. The outer engagement disc 213 has a circular outer periphery or contour with at least on projection projecting therefrom toward the outside, said projection(s) corresponding to the groove(s) in the outer wall 211b of the clutch housing 211 with respect to number, position and size. The ring-shaped or annular outer engagement disc 213 comprises a plurality of bores through the ring formed by the outer engagement disc 213 for allowing viscous fluid to flow therethrough. Preferably, the outer engagement disc 213 is made of steel.

Between each two discs 212, 213 there is arranged a spacer disc 214 which is preferably made of highly temperature resistant plastic.

All of the aforementioned parts of the viscous braking system 200 are arranged on a wheel axle 215 extending from one part of the chassis to the other. The clutch housing 211 is filled with an appropriate viscous fluid, preferably viscous oil, so as to achieve the desired braking characteristics (cf. FIG. 40).

A working element 3 of a hydraulic actuation system such as shown in FIGS. 1–3 or 6–8 is provided for actuation of the viscous brake so as to cause a braking engagement of the follower 208 with the wheel 204 via the viscous brake.

Modifications of the viscous braking system, in particular of the viscous brake, are possible, for example by simple mechanical reversals.

In FIGS. 42–44, the AFS including the viscous braking system is shown in an assembled condition. As may be seen best in FIG. 43, the possibilities of application or use of the wheel are not affected thanks to the small size of the AFS. In particular, the same inclination is possible with or without the AFS of the present invention. Also, the optical appearance is not affected by the AFS, for example in inline skates.

Figure 45:
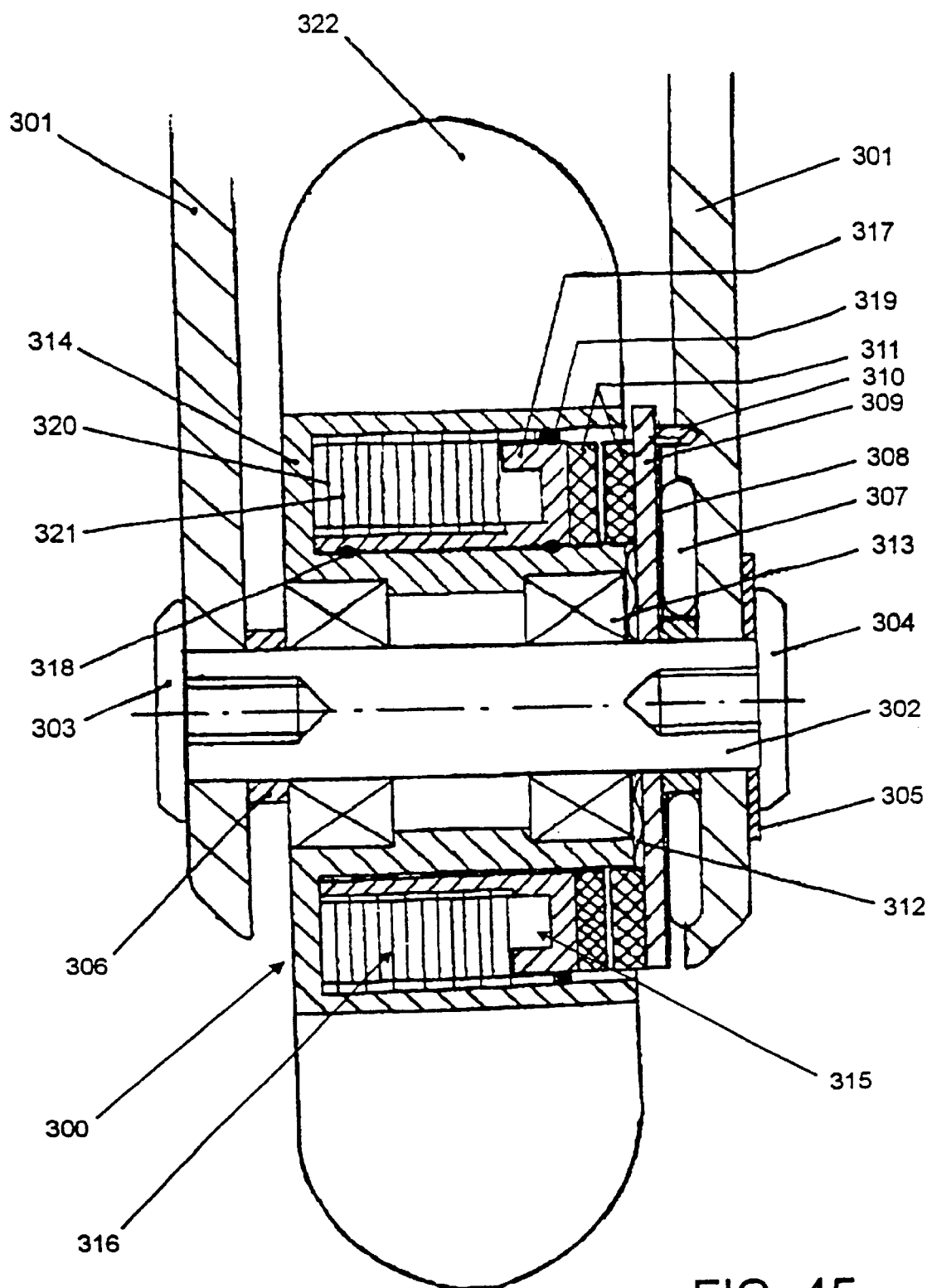
FIG. 45 is a schematic sectional view of another embodiment of the present invention, generally similar to the embodiment of FIGS. 41–44.
Figure 46:
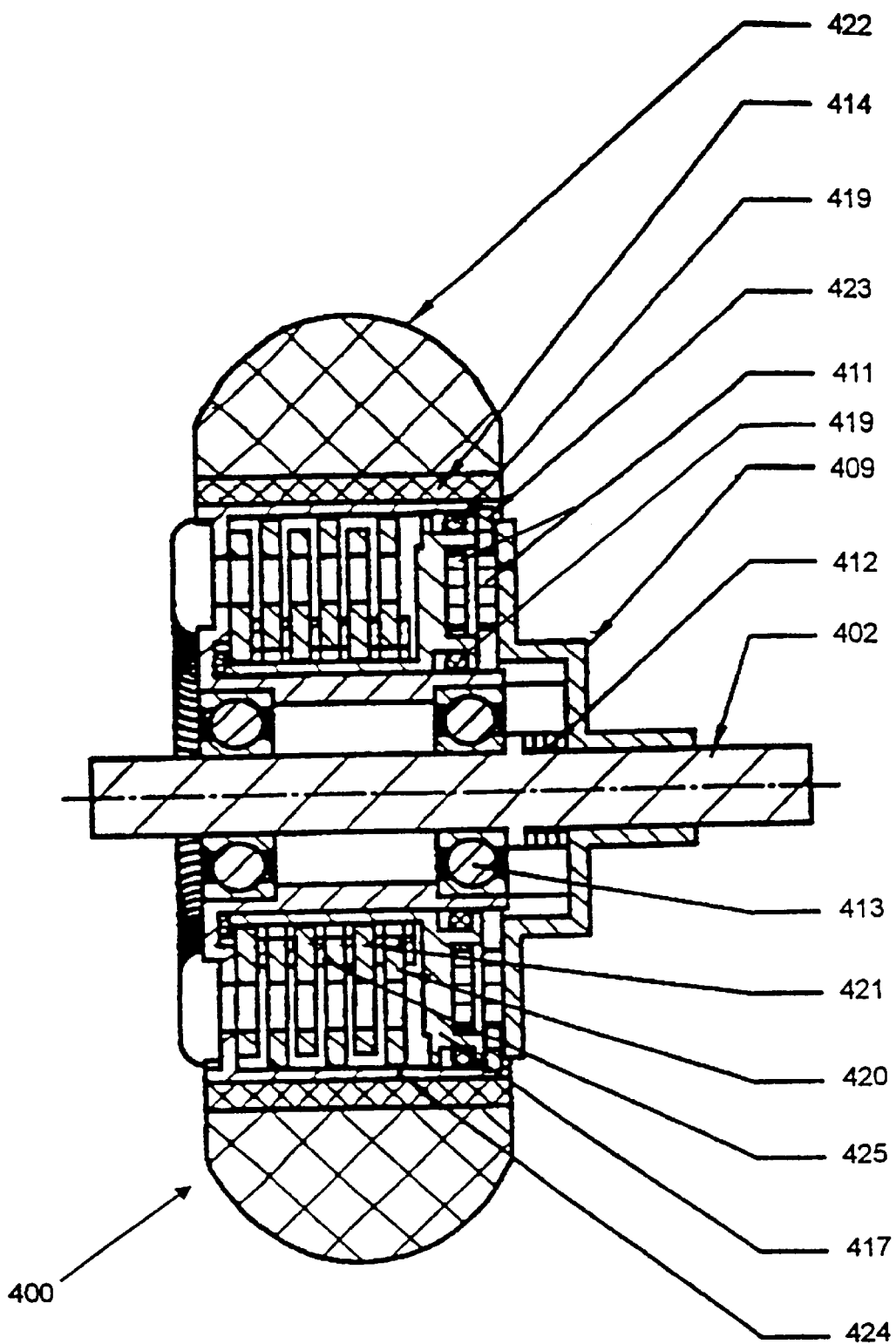
FIG. 46 is a schematic sectional view of another embodiment of the present invention, generally similar to the embodiment of FIG. 45.

The braking system of the present invention can be further integrated into a wheel such as an inline skate roller. Such embodiments are shown in FIGS. 45 and 46. In FIG. 45, a roller 300 is rotatably mounted in a chassis 301 by means of an axle 302. The axle 302 is attached to the chassis 301, preferably by fastening screws 303, 304. Preferably, a spacer sleeve 306 is provided on the axle 302 between the chassis 301 and the roller 300.

While the spacer sleeve 306 is disposed on the left side in FIG. 45 so as to provide a distance between the roller 300 and the chassis 301, a similar spacer sleeve is provided on the right side in FIG. 45 which, together with a recess in the chassis 301, forms a receptacle or chamber for one or more actuation bellows 307. The actuation bellows 307 abut against the chassis 301 upon actuation thereof. Since the chassis 301 is weakened at that location due to the recess, a reinforcement disc 305 may be provided between the head of the fastener screw 304 and the chassis 301, namely similar to a washer.

The actuation bellows 307 acts via a heat insulation disc 308, preferably made of mica, on a braking plate 309 which is locked with respect to rotation to the chassis 301, for example by an axial projection 310, but which can be moved axially to a limited extent for actuation of the brake. A ring-shaped or annular brake lining 311 is attached to the braking plate 309 and cooperates during braking with a corresponding brake lining 311 attached to the roller 300. It should be noted, however, that it is basically sufficient to provide only one brake lining cooperating with a corresponding opposite surface.

A releasing or disconnecting spring 312 is arranged between the braking plate 309 and the roller 300 so as to separate the brake linings 311 from each other after the braking process is terminated.

The roller 300 is supported on the axle 302 by means of ball bearings 313. The roller 300 includes a rim 314 which is preferably made of plastic, steel or MIM material and which has an axially accessible chamber 315 for receiving some kind of viscous clutch or viscous brake 316. The viscous clutch or brake 316 has a follower sleeve 317 which is rotatably supported in the chamber 315. The brake lining 311 on the side of the wheel is attached to the follower sleeve 317. The follower sleeve 317 abuts against the radial interior of the chamber 315 and comprises a flange closing the chamber 315 at the axially open side thereof. The portion of the chamber 315 dosed off by the follower sleeve 317 is filled with an appropriate viscous fluid and is sealed to the outside by means of O-rings 318, 319.

Clutch discs 320, 321 extend into the chamber 315, said clutch discs being alternatingly connected to the rim 314 and to the follower sleeve 317 as seen in axial direction. Thus, the discs 320 are connected to the rim 314 and have an outer engagement whereas the discs 321 are connected to the follower sleeve and have an inner engagement. The operation of a viscous clutch or a viscous brake, respectively, is known in the art and further description in detail is therefore not necessary.

A tire 322 is attached to the rim 314, in particular in a latching or locking manner, axially abutting and secured with respect to torque. The tire 322 is preferably made of rubber and is vulcanized onto the rim 314. As an alternative, the tire could be made of molded plastic.

Upon actuation of the brake, firstly the at least one actuation bellows 307 expands in axial direction. The actuation bellows 307 abuts against the chassis 301 and moves the braking plate 309 in axial direction towards the roller 300 against the force of the releasing spring 312. The relatively stationary brake lining on the braking plate 309 comes into engagement with the rotating brake lining on the follower sleeve 317. The frictional engagement results in a braking effect which is transmitted to the follower sleeve 317. However, the braking effect does not act directly on the tire 322 of the roller 300 since such direct or immediate braking effect would cause blocking of the roller 300 and flattening of the fire. The braking effect applied to the follower sleeve 317 will be transferred to the rim 314 and thus to the tire 322 via the viscous clutch or viscous brake 316. This provides better dosage of the braking effect and does not result in blocking of the roller 300.

FIG. 46 shows a modification of the braking device of FIG. 45 wherein the chassis and the actuation bellows are not shown.

A roller 400 is supported on an axle 402 by means of ball bearings 413. The roller comprises a rim 414 and a tire 422. In this embodiment, a brake drum 424 is provided radially between the rim 414 and the axle 402, said brake drum being rotatably fixedly mounted to the rim 414. A brake plate 409 supported on the axle 402 comprises an axial flange running on the axle 402. In a radially central portion of the brake plate 409, an axial step is provided. This makes room in axial direction so as to accommodate a release spring package 412 or, alternatively, a simple release spring (not shown) in the axle 402. Brake linings 411 are attached to the brake plate 409 on the one side and to a follower sleeve 417 on the other side, said brake linings being adapted to be brought into engagement or cooperation in axial direction. As with the preceding embodiment the use of only one brake lining is envisaged With the help of O-rings 419, the follower sleeve 417 closes a chamber for the viscous clutch or brake in the brake drum 424. A securing ring 423 secured the follower sleeve 417 and thus the viscous clutch or brake against axial movement out of the brake drum 424. The viscous clutch or brake consists essentially of inner discs 421 rotatably fixedly mounted to the follower sleeve 417 and outer discs 420 rotatably fixedly mounted to the brake drum 424. In a radially inner region, a respective intermediate disc 425 is disposed between the clutch discs (inner and outer discs) 420, 421. The intermediate disc 425 serves as a spacer and for stabilizing the clutch discs 420, 421. Preferably, the clutch discs 420, 421 comprise holes.

The operation of the braking device according to FIG. 46 is similar to the one according to FIG. 45 and is therefore not described in detail.

The brake of the present invention provides an extremely effective brake enabling very short lengths of brake path. Yet, blocking of wheels and flattening are reliably avoided.

Modifications of the invention are readily available.

What is claimed is:

1. A skate comprising a shoe, a chassis, rollers suspended in said chassis and a braking system for at least one of said rollers, said braking system comprising: a braking element for engagement with said roller; at least one actuation element arranged to act on said braking element;

characterized in that the braking force of said braking system obtainable at low rotational or rolling speed of the roller to be braked is small and increases with increasing rotational or rolling speed of the roller to be braked.

2. The skate of claim 1 characterized in that a device is arranged between said braking element and said actuation element, said device upon braking allowing defined entrainment of the braking element by the roller to be braked.

3. The skate of claim 2 characterized in that said device between said braking element and said actuation element is a viscous brake or clutch.

4. The skate of claim 3 characterized in that said viscous brake comprises: a stationary housing; a follower connected to said braking element and rotatable relative to said housing; at least one inner engagement disc; and at least one outer engagement disc, said housing together with said follower defining a chamber in which said at least one inner engagement disc and said at least one outer engagement disc are arranged and which is filled with a viscous fluid, and said inner engagement disc and said outer engagement disc being arranged such that, upon a relative rotation of said housing and said follower, the discs are correspondingly rotated relative to each other.

5. The skate of claim 4 characterized in that said at least one inner engagement disc is in engagement with said follower and said at least one outer engagement disc is in engagement with said housing.

6. The skate of claim 5 characterized in that said follower is formed integrally with said braking element.

7. The skate of claim 6 characterized in that said braking element is ring-shaped or annular.

8. The skate of claim 4 characterized in that said follower is formed integrally with said braking element.

9. The skate of claim 1 characterized in that said braking element is ring-shaped or annular.

10. The skate of claim 1 characterized in that said braking element comprises a plurality of cooling fins or ribs.

11. The skate of claim 1 characterized in that said braking element acts on said roller via a device, said device upon braking allowing a defined entrainment of an intermediate element by the roller to be braked.

12. The skate of claim 1 characterized in that a viscous brake is arranged between said braking element and said roller, said viscous brake upon braking allowing a defined entrainment of an intermediate element by the roller to be braked.

13. The skate of claim 2 characterized in that said viscous brake comprises: a housing rotatably fixedly connected to said roller; a follower rotatable with respect to said housing; at least one inner engagement disc; and at least one outer engagement disc; said housing together with said follower defining a chamber in which said at least one inner engagement disc and said at least one outer engagement disc are arranged and which is filled with a viscous fluid, and said inner engagement disc and said outer engagement disc being arranged such that, upon a relative rotation of said housing and said follower they are correspondingly rotated relative to each other.

14. The skate of claim 13 characterized in that said at least one inner engagement disc is in engagement with said follower, and said at least one outer engagement disc is in engagement with said housing.

15. The skate of claim 1 characterized in that said skate is a roller skate.

16. The skate of claim 1 characterized in that said skate is an inline skate.

* * * * *